US007636564B2

(12) United States Patent
Funato

(10) Patent No.: US 7,636,564 B2
(45) Date of Patent: Dec. 22, 2009

(54) INFORMATION LINK SERVICE SYSTEM, ELECTRONIC EQUIPMENT, MOBILE TERMINAL, AUTHENTICATION APPARATUS AND COMMUNICATION METHOD

(75) Inventor: Yuji Funato, Yokohama (JP)

(73) Assignee: Alpine Electronics, Inc., Tokyo (JP)

( * ) Notice: Subject to any disclaimer, the term of this patent is extended or adjusted under 35 U.S.C. 154(b) by 141 days.

(21) Appl. No.: 11/212,499

(22) Filed: Aug. 26, 2005

(65) Prior Publication Data

US 2006/0052086 A1 Mar. 9, 2006

(30) Foreign Application Priority Data

Sep. 7, 2004 (JP) ............................. 2004-260341
Jan. 31, 2005 (JP) ............................. 2005-023088

(51) Int. Cl.
*H04L 12/58* (2006.01)

(52) U.S. Cl. .............. 455/412.1; 455/414.3; 455/414.1; 713/168; 705/8; 705/14

(58) Field of Classification Search .............. 455/412.1, 455/414.1, 414.3; 713/200, 168; 705/8, 705/14

See application file for complete search history.

(56) References Cited

U.S. PATENT DOCUMENTS

| 6,631,247 | B1* | 10/2003 | Motoyama et al. .............. 399/8 |
| 6,636,733 | B1* | 10/2003 | Helferich ................. 455/412.2 |
| 6,898,422 | B2 | 5/2005 | Bern et al. |
| 7,010,289 | B2* | 3/2006 | Jijina et al. ............... 455/412.1 |
| 7,039,033 | B2* | 5/2006 | Haller et al. ................. 370/338 |
| 2001/0033225 | A1* | 10/2001 | Razavi et al. ............ 340/425.5 |
| 2002/0065698 | A1* | 5/2002 | Schick et al. .................. 705/8 |
| 2002/0132605 | A1* | 9/2002 | Smeets et al. ............... 455/411 |
| 2002/0143612 | A1* | 10/2002 | Barik et al. .................... 705/14 |
| 2002/0174360 | A1 | 11/2002 | Ikeda |
| 2002/0184062 | A1* | 12/2002 | Diaz ............................. 705/7 |
| 2003/0060232 | A1 | 3/2003 | Hashimoto et al. |
| 2003/0087629 | A1* | 5/2003 | Juitt et al. .................... 455/411 |
| 2004/0048622 | A1* | 3/2004 | Witkowski et al. ........ 455/456.6 |
| 2004/0068695 | A1 | 4/2004 | Daniell et al. |
| 2004/0203974 | A1* | 10/2004 | Seibel ........................ 455/517 |

FOREIGN PATENT DOCUMENTS

| EP | 1 003 307 A2 | 5/2000 |
| EP | 1 069 539 A2 | 1/2001 |
| WO | WO 99/21306 A1 | 4/1999 |
| WO | WO 00/39657 A2 | 7/2000 |

* cited by examiner

*Primary Examiner*—Rafael Pérez-Gutiérrez
*Assistant Examiner*—Nimesh Patel
(74) *Attorney, Agent, or Firm*—Brinks Hofer Gilson & Lione

(57) ABSTRACT

An internet service server transmits an information link mail to a cellular phone through a cellular phone mail server. If the received e-mail is an information link mail, the cellular phone transfers it, for example, to a navigation apparatus. Upon receipt of the information link mail, the navigation apparatus starts a predetermined application and provides a service to a user. The cellular phone may start a predetermined application and store predetermined information in the cellular phone. The cellular phone can communicate with an authentication apparatus through a wireless tag reader. The authentication apparatus checks predetermined information and performs authentication as a result of the check.

32 Claims, 15 Drawing Sheets

FIG. 4

INSPECTION TIME MANAGEMENT TABLE

| USER NAME | TYPE OF VEHICLE | LAST INSPECTION DATE | NEXT INSPECTION DATE | E-MAIL ADDRESS | SHOP |
|---|---|---|---|---|---|
| aa aa | aaa | 2003/7/30 | 2004/7/1 | aa@aa.com | aaaa... |
| bb bb | bbb | 2004/1/14 | 2004/12/15 | bb@bb.com | bbbb... |
| ⋮ | ⋮ | ⋮ | | ⋮ | ⋮ |

FIG. 5

NOTIFICATION SCREEN

Dear Mr. XXX,

This is to notify you about the next inspection time for your vehicle.

The nearest shop you may stop by is located at:

XXXX XXX SHOP

Address: XXXXX

Tel: XX-XXXX-XXX1

Fax: XX-XXXX-XXX2

FIG. 10

CUSTOMER TABLE

| NAME | AGE | ADDRESS | E-MAIL ADDRESS |
|---|---|---|---|
| aa aa | aa | 〒aaa-aaaa aa St., aaa City, aa-aa | aa@aa.com |
| bb bb | bb | 〒bbb-bbbb bb St., bbb City, bb-bb | bb@bb.com |
| ⋮ | ⋮ | ⋮ | ⋮ |

NOTIFICATION SCREEN

INFORMATION LINK SERVICE SYSTEM, ELECTRONIC EQUIPMENT, MOBILE TERMINAL, AUTHENTICATION APPARATUS AND COMMUNICATION METHOD

BACKGROUND OF THE INVENTION

1. Field of the Invention

The present invention relates to an information link service system, electronic equipment, a mobile terminal, an authentication apparatus and a communication method and particularly relates to an information link service in a system having a network of electronic equipment such as vehicle-mounted equipment, a mobile terminal such as a cellular phone, and an authentication apparatus.

2. Description of the Related Art

Conventionally, a system exists which provides a service to a user in conjunction with an access by vehicle-mounted electronic equipment mounted in a vehicle (called vehicle-mounted equipment hereinafter). The service may include downloading an upgraded version of an application or data and/or notifying the driver of the time for an inspection or oil change through a navigation apparatus.

However, in the pull-type system, the driver must perform manual operations to access the server. Therefore, the user cannot check the presence of any upgrade version of software or data, or the time for an inspection or oil change unless the user himself/herself operates the apparatus.

In order to solve these problems, Japanese Unexamined Patent Application Publication No. 10-63589 (called Patent Document 1 hereinafter) discloses a method for notifying a user of the presence of an upgrade version by e-mail.

This method allows a user to check the presence of any upgrade version of software or data or the time for an inspection or oil change without requiring the user to access the server. Furthermore, the method allows a user to check various kinds of service information by e-mail without requiring the user to access the server. This case may be applicable to the notification by e-mail of discount information on a bargain sale and information on reservation confirmation from a shop to a customer.

However, the technology has a problem that a user must perform a manual operation for installing an upgrade version, which requires the same amount of time and labor, although the user can check the presence of the upgrade version. Furthermore, a user must manually access the server for the specific time for the next inspection or oil change although the user can check whether an inspection or oil change is needed soon.

Furthermore, a navigation apparatus having a function for using a new service must be newly adopted, which is another problem. However, the mere notification of service information cannot easily verify the service receiver as a qualified person for receiving the service. Therefore, the service receiver must receive a ticket therefor separately and present the ticket to enter or must present his/her membership card at the entrance of the shop.

SUMMARY OF THE INVENTION

Accordingly, the present invention was made in view of these problems, and it is an object of the present invention to provide an information link service system, electronic equipment such as vehicle-mounted equipment, mobile terminal such as a cellular phone, authentication apparatus and communication method, which can provide a service and greatly reduce the time, labor and costs that a user must pay therefor.

In order to achieve this object, there is provided, according to one aspect of the present invention, an information link service system including a server, a mobile terminal which can receive e-mail from the server, and electronic equipment which is communicable with the mobile terminal over a predetermined network, wherein the server transmits to the mobile terminal an information link mail including a description for executing a predetermined application, the mobile terminal has a mail discriminating portion for discriminating whether a received e-mail is an information link mail or not and a mail transferring portion for, if the e-mail is an information link mail, transferring the information link mail to the electronic equipment, and the electronic equipment has an application executing portion for executing a predetermined application based on the described information in the information link mail transferred from the mobile terminal. The transfer of an information link mail from a cellular phone to electronic equipment, for example, can expand a service to be provided from the electronic equipment to a user without requiring a telephone function in the electronic equipment. Thus, the time, labor and costs that a user must pay can be greatly reduced, and a PUSH-type service can be provided. Therefore, information which could not be obtained in the past without connection to a server by dialup, for example, can be reliably provided to a user.

The mail discriminating portion may discriminate whether a received e-mail is an information link mail with reference to predetermined tag information in the e-mail.

The information link service system may further include an authentication apparatus communicable with the mobile terminal and the server over a predetermined network, the authentication apparatus having a comparing portion for comparing predetermined information including an expiration date based on the information link mail received from the mobile terminal with information that the server has and an authenticating portion for performing authentication based on the result of the comparison. For example, a user can receive a service without requiring the user to present his/her membership card by transmitting expiration date information and authentication information from a mobile telephone, for example, to the authentication apparatus and being authenticated.

The server may have a table in which information relating to the mobile terminal is associated with information relating to the electronic equipment and transmits the e-mail with reference to the table.

The electronic equipment may be vehicle-mounted equipment, and the information relating to the electronic equipment may include information relating to an inspection of a vehicle having the electronic equipment.

The server may transmit the e-mail at a predetermined timing.

The predetermined application may include a description for executing the update of a program included in the electronic equipment.

The predetermined application may include a description for sending predetermined information to a display portion included in the electronic equipment.

The electronic equipment may have a navigation function.

The server may update information in the table after the predetermined application is executed.

According to another aspect of the present invention, there is provided electronic equipment communicable with a mobile terminal, which can receive an e-mail over a predetermined network, the equipment including a receiving portion for receiving an information link mail including a description for executing a predetermined application transferred from the mobile terminal, and an application executing portion for executing a predetermined application based on information described in an information link mail received by the receiving portion. The transfer of an information link mail from a cellular phone to electronic equipment, for example, can expand a service to be provided from the electronic equipment to a user without requiring a telephone function in the electronic equipment. Thus, the time, labor and costs that a user must pay can be greatly reduced, and a PUSH-type service can be provided. Therefore, information which could not be obtained in the past without connection to a server by dialup, for example, can be reliably provided to a user.

In the electronic equipment, the predetermined application may include a description for executing an update of a program included in the electronic equipment. For example, the information link mail may be an e-mail notifying the existence of an update version of the application built in the electronic equipment, and the application may be an application for downloading and installing the update version from a predetermined server. The transfer of an information link mail from a cellular phone to the electronic equipment, for example, and the automatic update of an application in the electronic equipment can reduce the time, labor and costs that a user must pay and provide a PUSH-type service. Therefore, information which could not be obtained in the past without connection to a server by dialup, for example, can be reliably provided to a user.

The predetermined application may include a description for sending predetermined information to a display portion included in the electronic equipment. For example, the information link mail may be an e-mail notifying any one of an inspection time, oil change time, and oil filter exchange time, and the application may be an application for providing the notice information in the e-mail to a user. The notification of an inspection time, oil change time and oil filter exchange time from the electronic equipment can provide timely information.

The predetermined application may include a description for discriminating predetermined tag information within the information link mail and based on the predetermined tag information, supply service information, positional information on service supply, and a display prompting the selection of whether a destination is to be defined to the display portion. For example, the service information may be bargain information, and a user may check the positional information on the shop and define it as a destination so that the user can reach the shop easily and be provided with the service.

According to another aspect of the present invention, there is provided a mobile terminal communicable with electronic equipment over a predetermined network, the mobile terminal including a receiving portion for receiving an e-mail, a mail discriminating portion for discriminating whether the e-mail received by the receiving portion is an information link mail including a description for executing a predetermined application, a transferring portion for, if the e-mail is an information link mail, transferring the information link mail to the electronic equipment. The transfer of an information link mail from a cellular phone to electronic equipment, for example, can expand a service to be provided from the electronic equipment to a user without requiring a telephone function in the electronic equipment. Furthermore, the person to receive the service can be easily qualified by transmitting predetermined information based on an information link mail from a cellular phone to the authentication apparatus and being authenticated. Thus, the time, labor and costs that a user must pay can be greatly reduced, and a PUSH-type service can be provided. Therefore, information which could not be obtained in the past without connection to a server by dialup, for example, can be reliably provided to a user.

The information link mail may include expiration date information. This is effective if a service to be provided has a time limit.

The mobile terminal may further include an application executing portion for executing a predetermined application based on information described in the information link mail.

The predetermined application may include a description for storing predetermined information described in the information link mail in the mobile terminal.

The mobile terminal may further include a transmitting portion for transmitting predetermined information based on the information link mail to an authentication apparatus communicable with the mobile terminal over a predetermined network, the authentication apparatus having a comparing portion for comparing predetermined information based on the information link mail received from the mobile terminal with information that a server has and an authenticating portion for performing authentication based on the result of the comparison.

According to another aspect of the present invention, there is provided an authentication apparatus communicable with a mobile terminal which can receive an e-mail over a predetermined network, the authentication apparatus including a comparing portion for comparing predetermined information based on an information link mail received from the mobile terminal and including a description for executing a predetermined application with information that a memory included in the authentication apparatus has, and an authenticating portion for performing authentication based on the result of the comparison. The person to receive the service can be easily qualified by transmitting predetermined information based on an information link mail from a cellular phone to the authentication apparatus and being authenticated. Thus, the time, labor and costs that a user must pay can be greatly reduced, and a PUSH-type service can be provided. Therefore, information which could not be obtained in the past without connection to a server by dialup, for example, can be reliably provided to a user.

The predetermined information may be expiration date information and discount authentication information, and the authentication apparatus may be provided at a cashier in a store. The authentication apparatus may check expiration date information and discount authentication information and display the authentication result based on the result of the check on a display portion included in the authentication apparatus. Thus, a customer can receive a discount service easily from the store.

According to another aspect of the present invention, there is provided an authentication apparatus communicable with a server and a mobile terminal which can receive an e-mail over a predetermined network, the authentication apparatus including a comparing portion for comparing predetermined information based on an information link mail received from the mobile terminal and including a description for executing a predetermined application with information that the server has, and an authenticating portion for performing authentication based on the result of the comparison. The person to receive the service can be easily qualified by transmitting predetermined information based on an information link mail from a cellular phone to the authentication apparatus and being authenticated. Furthermore, the comparison with information that the server has allows the collective management of authentication information and does not require a memory, which stores authentication information, in the authentication apparatus. The use of the server can easily handle any change or addition of a detail of information included in the authentication information. Thus, the time, labor and costs that a user must pay can be greatly reduced, and a PUSH-type service can be provided. Therefore, information which could not be obtained in the past without connection to a server by dialup, for example, can be reliably provided to a user.

The predetermined information may be expiration date information and admission ticket authentication information. The authentication apparatus may be provided at an entrance gate, and the authentication apparatus may check the expiration date information and admission ticket information and control the entrance gate based on the result of the check. Thus, a subscriber can enter without receiving a ticket separately and presenting the ticket for admission.

The authentication apparatus may be placed in a rental shop, and the authentication apparatus may check expiration date information and rental reservation authentication information and display the authentication result on a display portion included in the authentication apparatus based on the result of the check. Thus, a subscriber can receive a rental service without presenting his/her membership card, for example, at the shop.

According to another aspect of the present invention, there is provided a communication method including the steps of discriminating whether an e-mail transmitted from a server is an information link mail including a description for executing a predetermined application, transferring, if the e-mail is an information link mail, the information link mail to electronic equipment, and executing, in the electronic equipment, a predetermined application based on information described in an information link mail transferred from a mobile terminal.

The communication method may further include the steps of, if the e-mail is the information link mail, executing, in the mobile terminal, a predetermined application based on information described in the information link mail, transmitting, from the mobile terminal, predetermined information based on the information link mail to an authentication apparatus communicable with the mobile terminal over a predetermined network, the authentication apparatus having a comparing portion for comparing predetermined information based on the information link mail received from the mobile terminal and information that the server has, and an authenticating portion for performing authentication based on the result of the comparison, checking, in the authentication apparatus, predetermined information based on the information link mail received from the mobile terminal, and performing, in the authentication apparatus, authentication based on the result of the check.

The present invention can provide an information link service system, electronic equipment, cellular phone, authentication apparatus and communication method, which can greatly reduce the time, labor and costs that a user must pay and provide a PUSH-type service.

BRIEF DESCRIPTION OF THE DRAWINGS

FIG. 4 is a diagram showing an inspection time management table according to the first embodiment of the present invention;

FIG. 5 is a diagram showing a notification screen example to be displayed on a display portion 7 in response to an operation shown in FIG. 3;

FIG. 10 is a diagram showing a customer table according to the second embodiment of the present invention;

DESCRIPTION OF THE PREFERRED EMBODIMENTS

Preferred embodiments for carrying out the present invention will be described in detail below with reference to the drawings.

First Embodiment

Figure 1:
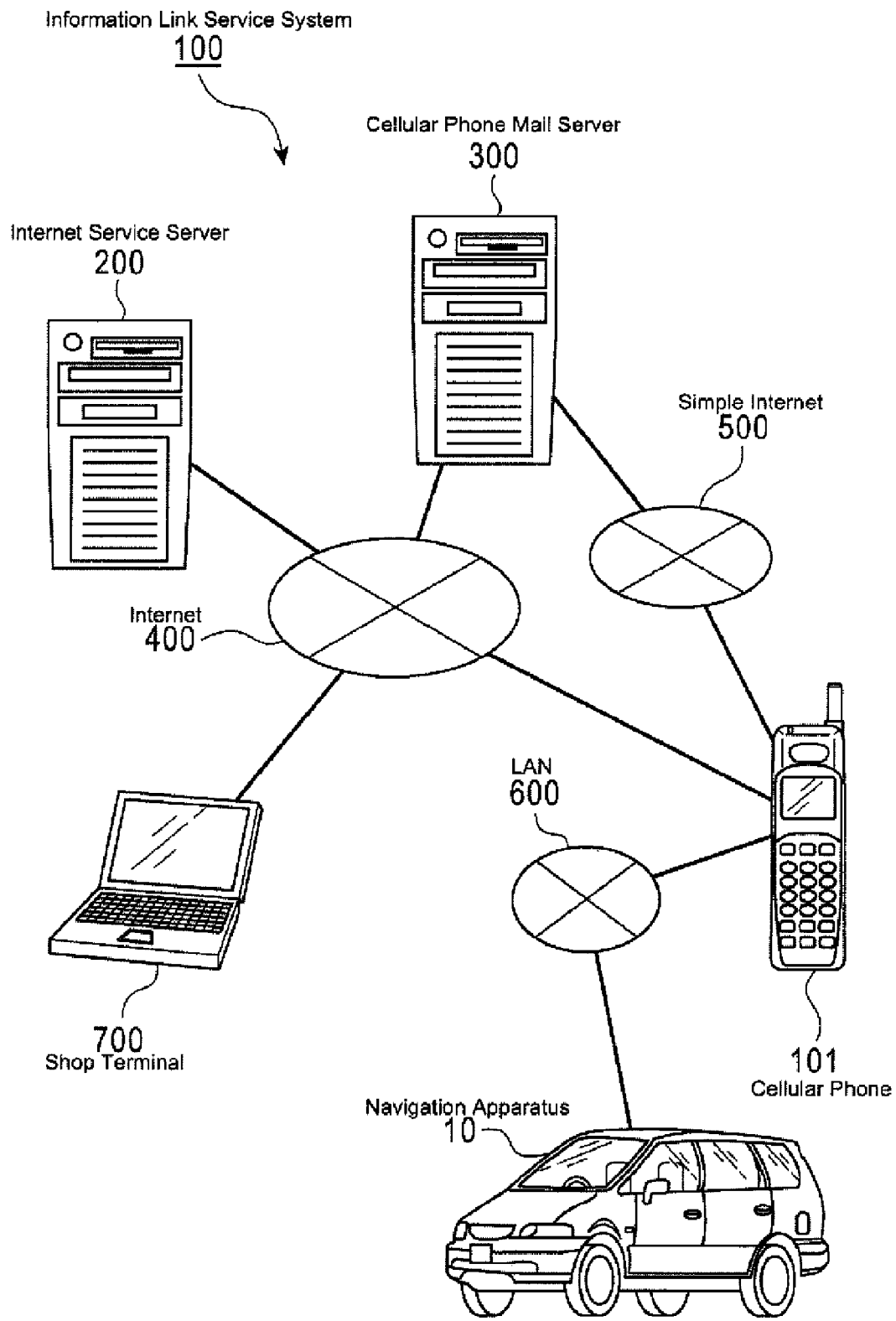
FIG. 1 is a system diagram showing a configuration of an information link service system 100 according to a first embodiment of the present invention.

A first embodiment of the present invention will be described in detail with reference to the drawings. FIG. 1 is a system diagram showing a configuration of an information link service system 100 according to this embodiment. As shown in FIG. 1, the information link service system 100 includes a navigation apparatus 10, a cellular phone 101, an internet service server 200, a cellular phone mail server 300, and a shop terminal 700. The navigation apparatus 10 may be mounted in a vehicle as a vehicle-mounted apparatus. The cellular phone 101 is owned by a user such as a driver. The internet service server 200 provides a service to the navigation apparatus 10. The cellular phone mail server 300 transmits e-mail to the cellular phone 101. The shop terminal 700 may be placed in a shop such as a dealer or a service station. Though this embodiment applies to the navigation apparatus 10, for example, the present invention is not limited thereto.

The vehicle-mounted apparatus may be a vehicle-mounted audio apparatus or a control apparatus for controlling driving.

The navigation apparatus 10 and the cellular phone 101 are communicably connected through a wireless local area network (LAN) 600, for example. However, the present invention is not limited thereto, and the network may be any network including a Bluetooth (registered trademark) and a wired network through a dedicated cable. The navigation apparatus 10 is connected to the Internet 400 by dial-up from the cellular phone 101 to access the internet service server 200. The internet service server 200 and the cellular phone mail server 300 are connected over the Internet 400, for example, but may be connected, for example, through a dedicated line or over a LAN. The internet service server 200 and the shop terminal 700 are connected through the Internet 400, for example, but may also be connected through a dedicated line or over a LAN. The cellular phone mail server 300 may transmit an e-mail to the cellular phone 101 over a simple Internet 500, for example.

Figure 2:
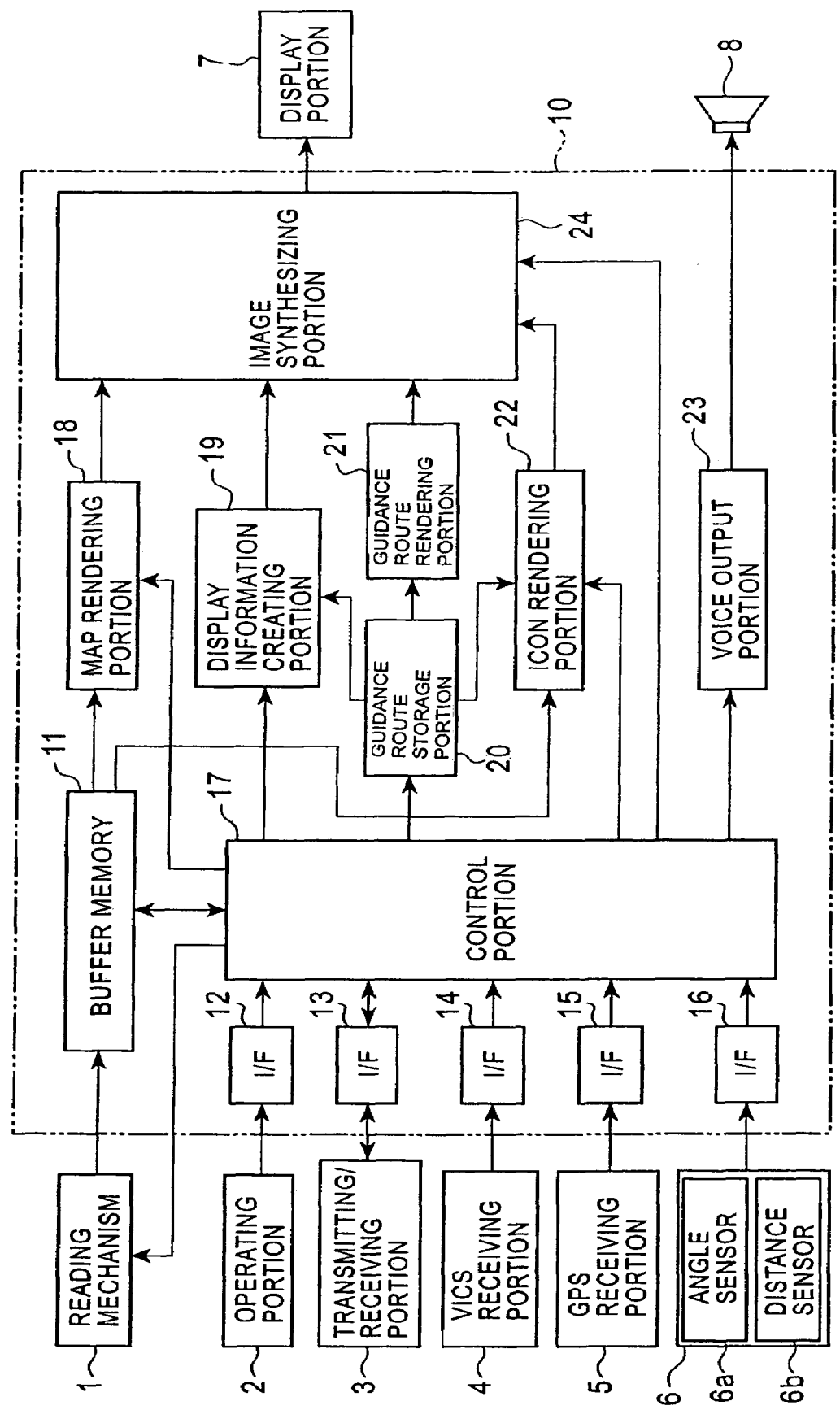
FIG. 2 is a block diagram showing a construction of a navigation apparatus 10 according to the first embodiment of the present invention.

Next, a construction of the navigation apparatus 10 will be described with reference to FIG. 2. In FIG. 2, a reading mechanism 1 is configured to read a recording medium, such as a CD (compact disk)-ROM (Read-Only Memory) and a DVD (Digital Versatile Disk)-ROM, which stores map data and other navigation data. However, the present invention is not limited thereto, and a storage apparatus such as a hard disk drive is also applicable.

An operating portion 2 is configured to enter an operation and/or a setting to the vehicle-mounted navigation apparatus 10 by a user such as a driver. This may be configured separately, e.g., as a remote controller apparatus or a control panel, or may be configured as a touch-panel input device integrated with a display portion 7, which will be described later. Furthermore, the operating portion 2 may be configured as a microphone for voice input.

A transmitting/receiving portion 3 is a communicating portion for connecting to the cellular phone 101 through the wireless LAN 600. The transmitting/receiving portion 3 may further have a function of communicating to a vehicle having a communication function present in a service area or a predetermined area (which may be also called communicable area).

A VICS (Vehicle Information Communication System) receiving portion 4 is configured to receive VICS information transmitted from a radio beacon or a light beacon. A GPS (Global Positioning System) receiving portion 5 is configured to receive a GPS signal transmitted from a GPS satellite and detect the latitude and longitude of the current position of the vehicle. A self-contained navigation sensor 6 includes an angle sensor 6a and a distance sensor 6b. The angle sensor 6a includes a gyro for detecting the direction of the vehicle. The distance sensor 6b generates a pulse for each predetermined distance traveled. The self-contained navigation sensor 6 detects the direction of advance and speed of the vehicle.

The display portion 7 may be a liquid crystal display device and is configured to display information such as a map, a guidance route, the current position of the vehicle, buildings, and other icons, which are provided from the navigation apparatus 10. A speaker 8 is configured to produce voice guidance information, for example, which also is provided from the navigation apparatus 10. The speaker 8 can additionally produce music received from an audio apparatus.

In the navigation apparatus 10, a buffer memory 11 is configured to temporarily store map data sent from the reading mechanism 1 under the control of a control portion 17, which will be described later. I/Fs (interfaces) 12, 13, 14, 15 and 16 are configured to connect to internal buses in the operating portion 2, transmitting/receiving portion 3, VICS receiving portion 4, GPS receiving portion 5, self-contained navigation sensor 6 and vehicle-mounted navigation apparatus 10, respectively.

The control portion 17 may be a computing apparatus such as a microcomputer and a CPU (central processing unit). The control portion 17 internally contains a navigation program and, in accordance with the program, performs various kinds of navigation-related processing such as detection of the current position of the vehicle based on a signal received from the GPS receiving portion 5 and self-contained navigation sensor 6, loading data on a map to be displayed from the reading mechanism 1 to the buffer memory 11, searching for a guidance route based on map data in the buffer memory 11, and searching for one or more guidance routes matching a defined search criteria by using the map data in the buffer memory 11, for example. However, the program may be stored in a CD-ROM or a DVD-ROM. In this case, the control portion 17 may load the program therefrom and execute the program as necessary.

A map rendering portion 18 is configured to perform processing for rendering a map image by using map data loaded in the buffer memory 11. A display information creating portion 19 is configured to create a menu screen (operation screen) and a mark such as a cursor in accordance with an operation state. A guidance route storage portion 20 is configured to store data on all nodes on a guidance route searched by the control portion 17 based on a departure location and a destination location or other search criteria and data of a guidance route changed during search (which will be called guidance route data hereinafter). A guidance route rendering portion 21 is configured to load guidance route data from the guidance route storage portion 20 and render the guidance route in a different display form (such as by highlighting with a different color and/or thickness of line) from that of the other roads. An icon rendering portion 22 is configured to perform processing for rendering an icon of a building, place, or other vehicles to be rendered on the map image. A voice output portion 23 includes a DSP (Digital Signal Processor) and supplies a voice signal to the speaker 8 based on a signal from the control portion 17.

An image synthesizing portion 24 is configured to display on the display portion 7 a guidance route rendered by the guidance route rendering portion 21, an operation screen and mark rendered by the display information creating portion 19, icons rendered by the icon rendering portion 22, and an image received from the control portion 17 superimposed over a map image rendered by the map rendering portion 18.

Figure 3:
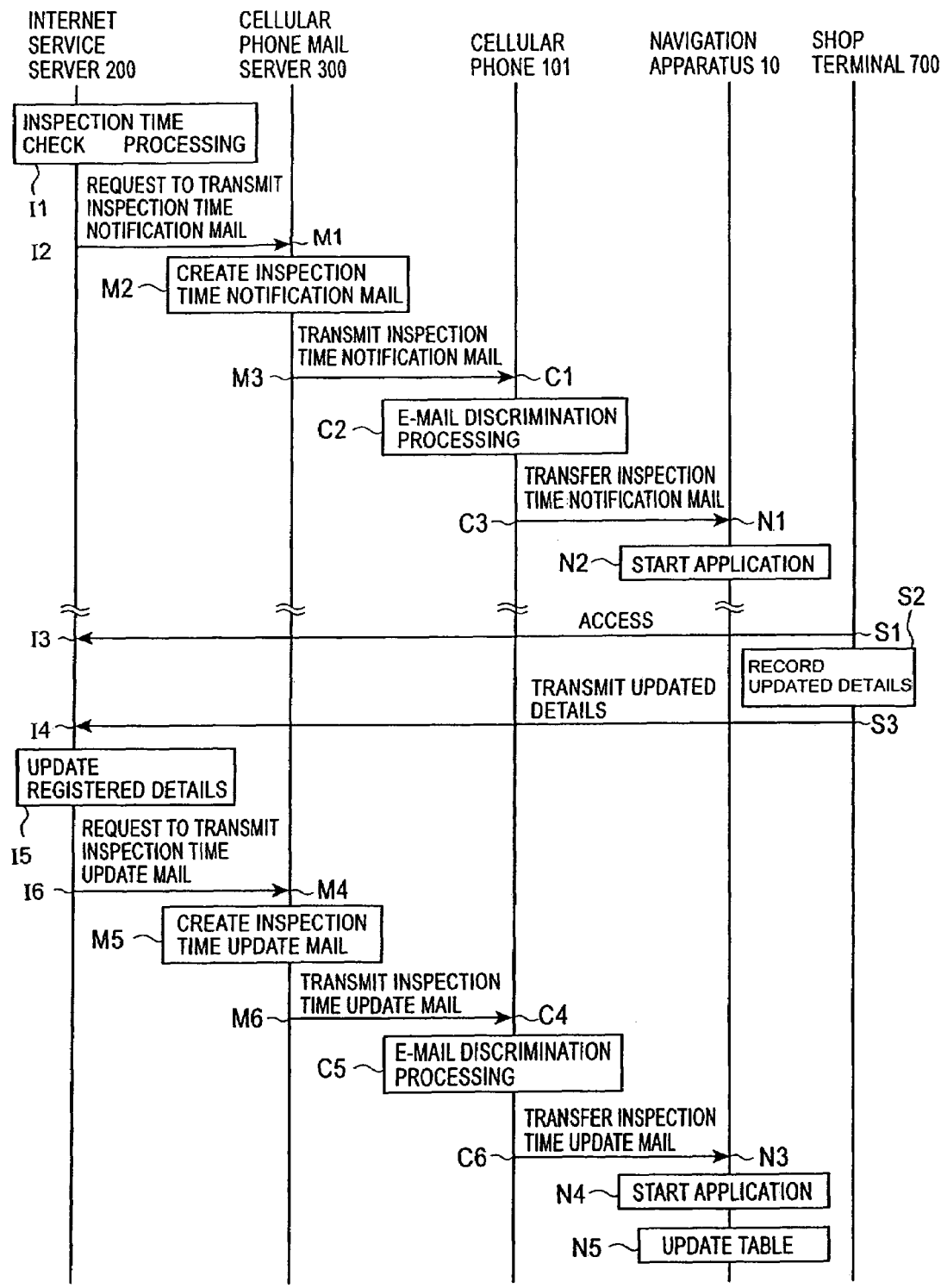
FIG. 3 is a sequence diagram showing operations for notifying a driver of the time for a vehicle inspection according to the first embodiment of the present invention.

Next, the operation of the information link service system 100 according to this embodiment will be described with reference to the drawings. FIG. 3 is a sequence diagram showing operations for providing notice of an automobile inspection time to a driver according to this embodiment. However, for example, notice of an oil change time, an oil filter exchange time and the like also may be provided.

As shown in FIG. 3, the internet service server 200 first performs inspection time check processing (I1). In order to implement this, the internet service server 200 manages an inspection time for each user (or vehicle). The internet service server 200 holds a table (inspection time management table) as shown in FIG. 4 and manages an inspection time for each user with reference to the table. As shown in FIG. 4, the inspection time management table stores the correspondence among names of users ("USER NAME" in FIG. 4), the types of vehicles owned by the users ("TYPE OF VEHICLE" in FIG. 4), the last inspection dates ("LAST INSPECTION DATE" in FIG. 4), the next inspection dates ("NEXT INSPECTION DATE" in FIG. 4) and contact e-mail addresses ("E-MAIL ADDRESS" in FIG. 4). Extended services can be provided to a user by registering the nearest shop (such as a dealer or service station where an inspection is available) to the user, including the shop name, address, and telephone/facsimile number, and providing this information to the user by e-mail.

The internet service server 200 refers to the next inspection dates and determines whether any one of them is applicable in the inspection time check processing. If any one is applicable in the inspection time check processing, the internet service server 200 requests the cellular phone mail server 300 to transmit an e-mail for notifying the user that the inspection time is coming (I2→M1). At the same time, information such as the destination e-mail address, type of vehicle, last inspection date, next inspection date and shop is also provided to the cellular phone mail server 300.

The cellular phone mail server 300 receives the inspection time notification mail transmission request from the internet service server 200, creates an e-mail (inspection time notification mail) based on the user's e-mail address and transmission information received from the internet service server 200 (M2), and transmits the e-mail to the cellular phone 101 (M3→C1). Note that the inspection time notification mail is an information link mail and has, in the body or a predetermined extended area, a description for starting a predetermined application (called start-application information hereinafter) in the navigation apparatus 10 as the transmission information.

The cellular phone 101 receives the inspection time notification mail and performs processing for discriminating whether the received e-mail is normal mail or an information link mail (e-mail discrimination processing) (C2). If it is an information link mail, the inspection time notification mail is transferred to the navigation apparatus 10 (C3→N1). In other words, the cellular phone 101 has a mail discriminating portion for discriminating whether a received e-mail is an information link mail and a mail transferring portion for, if the e-mail is an information link mail, transferring the information link mail to the vehicle-mounted apparatus. Whether a received e-mail is an information link mail or not can be easily discriminated by analyzing predetermined tag information in the e-mail. Alternatively, only necessary information may be transferred to the navigation apparatus 10 instead of the entire e-mail. When the cellular phone 101 and the navigation apparatus 10 are not connected, the cellular phone 101 transfers it at the next connection.

The navigation apparatus 10 receives the inspection time notification mail, reads the start-application information described in the inspection time notification mail, and starts the corresponding application (which may be called information link program) (N2). In other words, the navigation apparatus 10 has an application executing portion for executing a predetermined application based on the information described in the information link mail transferred from the cellular phone 101. Since an inspection time is provided to a user, for example, in this embodiment, the operation causes the display portion 7 of the navigation apparatus 10 to display a notification screen as shown in FIG. 5.

A shop staff person, having completed the inspection, accesses the internet service server 200 from the shop terminal 700 in order to register the completion of the inspection with the internet service server 200 (S1→I3). Then, the staff person records the completion of the inspection (which will be called updated details) in the shop terminal 700 (S2) and transmits it to the internet service server 200 (S3→I4). In response to the receipt of the updated details, the internet service server 200 updates the inspection time management table shown in FIG. 4 based on the updated details (I5).

The internet service server 200, having updated the inspection time management table, requests the cellular phone mail server 300 to transmit to the cellular phone 101 an information link mail (called inspection time update mail hereinafter) including the application to be updated (called inspection data updated application) and information on updated details (called update data hereinafter) together with a predetermined tag (I6→M4). In response thereto, the cellular phone mail server 300 creates an inspection time update mail (M5) and transmits the mail to the cellular phone 101 (M6→C4). The cellular phone 101, having received inspection time update mail, determines the type of the received mail from the predetermined tag (C5). If the mail is an inspection time update mail, the cellular phone 101 transfers the mail to the navigation apparatus 10 (C6→N3). The navigation apparatus 10 reads update data described in the inspection time update mail and information on the start of the inspection data update application and starts the corresponding application (N4). Upon the start of the inspection data update application in this way, the navigation apparatus 10 updates the table, which manages inspection times and history, in the navigation apparatus 10 based on the update data in accordance with the inspection data update application (N5). Thus, the inspection times can be managed to save the user's time and effort. Note that the table may be similar to the inspection time management table shown in FIG. 4.

According to this embodiment, these operations allow the secure notification to a user of information that the user may have needed to connect to the server by dial-up to obtain in the past. Furthermore, the service of providing notice of an inspection time and prompting the inspection to the user can be provided as a PUSH-type service and greatly reduce the effort and costs that the user must incur.

Figure 6:
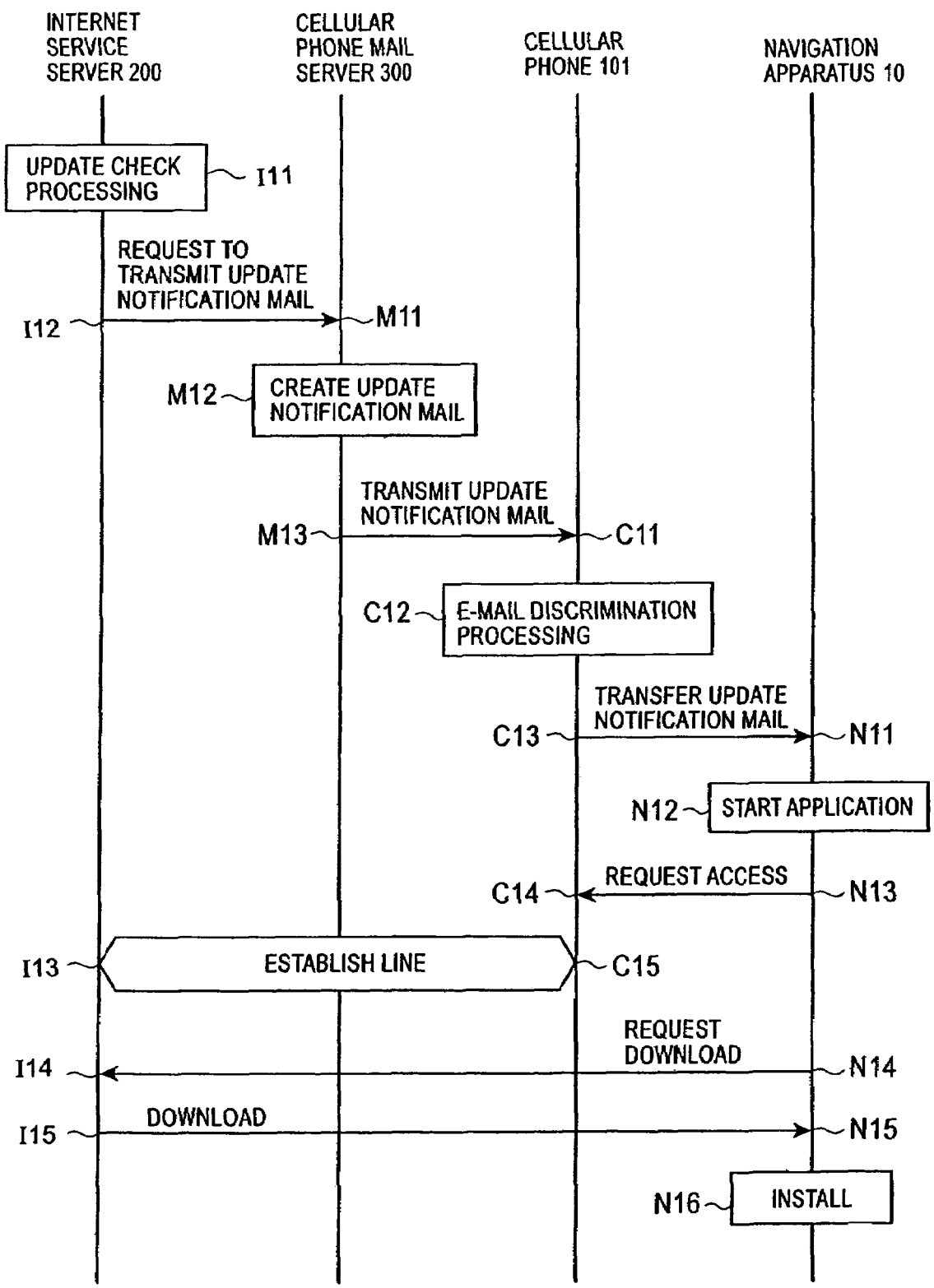
FIG. 6 is a sequence diagram showing operations for updating (or upgrading) an application built in the navigation apparatus 10 according to the first embodiment of the present invention.

FIG. 6 shows operations for updating (or upgrading) an application contained in the navigation apparatus 10.

As shown in FIG. 6, the internet service server 200 (which may be a content provider in this embodiment) first performs update check processing (I11). In order to implement this, the internet service server 200 checks that the update version of the application has been registered. If the update version of the application exists, the internet service server 200 requests the cellular phone mail server 300 to transmit an e-mail (update notification mail) for notifying a user that the update version exists (REQUEST TO TRANSMIT UPDATE NOTIFICATION MAIL: I12→M11).

The cellular phone mail server 300 receives the update notification mail transmission request from the internet service server 200, creates an e-mail (update notification mail) based on the user's e-mail address and transmission information received from the internet service server 200 (M12), and transmits the e-mail to the cellular phone 101 (M13→C11). Note that the update notification mail is an information link mail and has, in the body or a predetermined extended area, a description for starting a predetermined application (start-application information) in the navigation apparatus 10 as the transmission information.

The cellular phone 101 receives the update notification mail and performs processing for discriminating whether the received e-mail is normal mail or an information link mail (e-mail discrimination processing) (C12). If it is an information link mail, the update notification mail is transferred to the navigation apparatus 10 (C13→N11). In other words, the cellular phone 101 has a mail discriminating portion for discriminating whether a received e-mail is an information link mail and a mail transferring portion for, if the e-mail is an information link mail, transferring the information link mail to the vehicle-mounted apparatus. Whether a received e-mail is an information link mail or not can be easily discriminated by analyzing predetermined tag information in the e-mail. Alternatively, only necessary information may be transferred to the navigation apparatus 10 instead of the entire e-mail. When the cellular phone 101 and the navigation apparatus 10 are not connected, the cellular phone 101 transfers it at the next connection.

The navigation apparatus 10 receives the update notification mail, reads the start-application information described in the update notification mail, and starts the corresponding application (information link program) (N12). In other words, the navigation apparatus 10 has an application executing portion for executing a predetermined application based on the information described in the information link mail transferred from the cellular phone 101. Since an application is updated automatically, for example, in this embodiment, the operation causes the navigation apparatus 10 to request the cellular phone 101 to access the Internet 400 (REQUEST ACCESS: N13→C14).

In response to the access request, the cellular phone 101 accesses the Internet 400 and establishes a line to the internet service server 200 (C15/I13). After the line between the cellular phone 101 and the internet service server 200 is established, the navigation apparatus 10 accesses the internet service server 200 through the cellular phone 101 and requests a download of the update version (REQUEST DOWNLOAD: N14→I14). In response thereto, the internet service server 200 downloads the requested update version to the navigation apparatus 10 (I15→N15). The navigation apparatus 10 receives the update version and installs it automatically (N16).

According to this embodiment, these operations allow the secure supply to a user of information that the user may have needed to connect to the server by dial-up to obtain in the past. Furthermore, the service of updating an application automatically can be provided as a PUSH-type service and greatly reduce the effort and costs that the user must incur. Alternatively, a user may choose whether the updated version is to be downloaded or not.

Second Embodiment

Figure 7:
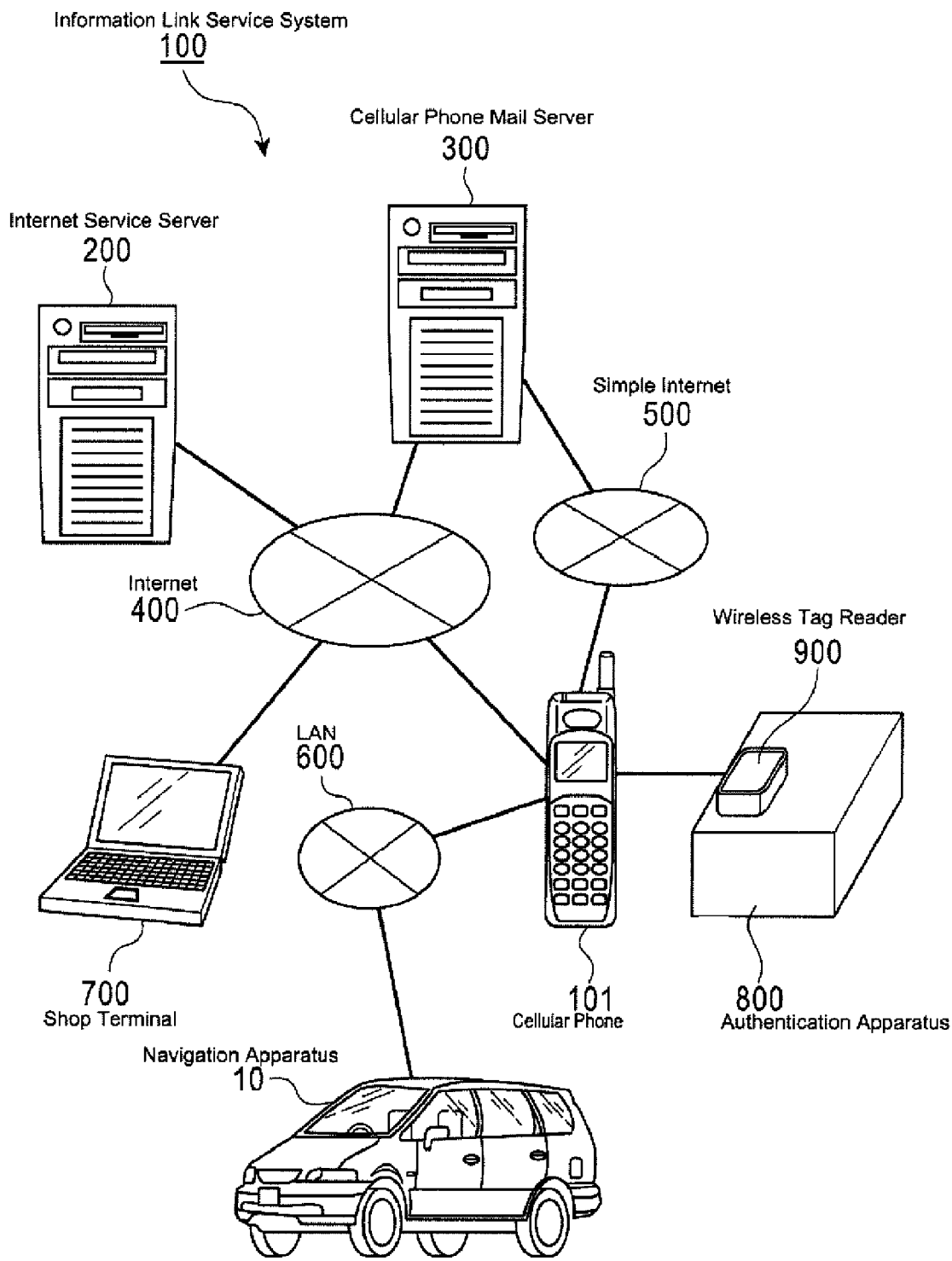
FIG. 7 is a system diagram showing a configuration of an information link service system 100 according to a second embodiment of the present invention.

A second embodiment of the present invention will be described in detail with reference to the drawings. FIG. 7 is a system diagram showing a configuration of an information link service system 100 according to this embodiment. As shown in FIG. 7, the components of the information link service system 100 are the same as the components of the first embodiment shown in FIG. 1, except that the second embodiment further includes an authentication apparatus 800. In this embodiment, a wireless tag reader 900 communicably connected to the cellular phone 101 includes the authentication apparatus 800. However, the connection may be established via a Bluetooth (registered trademark), a wireless LAN or an infrared connection, for example, without being limited thereto. The communication desirably adopts the highly convenient non-contact type. The communication may be triggered by a user's operation on the cellular phone 101 or any other way.

According to this embodiment, the components of the information link service system 100 are communicably connected in substantially the same manner as that of the components of the first embodiment shown in FIG. 1. However, in this embodiment, the authentication apparatus 800 is connected in communication to the cellular phone 101 through the wireless tag reader 900.

Figure 8:
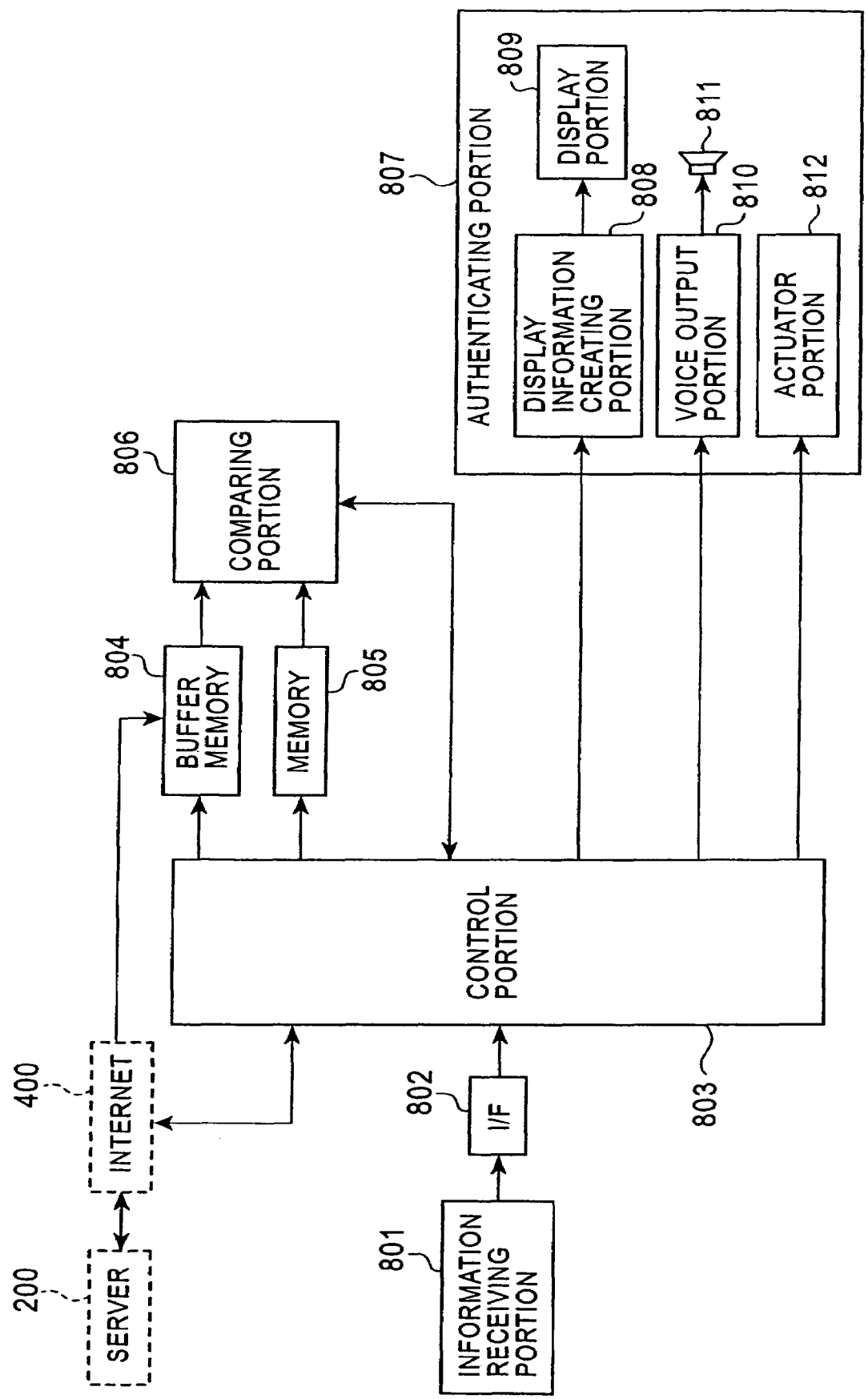
FIG. 8 is a block diagram showing a construction of an authentication apparatus 800 according to the second embodiment of the present invention.

Now, the construction of the authentication apparatus 800 will be described in detail with reference to FIG. 8. In FIG. 8, the authentication apparatus 800 is communicably connected to the internet service server 200 over the Internet 400. The internet service server 200 and Internet 400 indicated in dashed line are excluded from the construction of the authentication apparatus 800. However, the connection may be established through a dedicated line or a LAN, for example, instead of the Internet 400. An information receiving portion 801 includes a wireless tag reader and is configured to receive predetermined information such as expiration date information and authentication information transmitted by a cellular phone.

An I/F (interface) 802 is configured to connect to internal buses in the information receiving portion 801 and the authentication apparatus 800.

A buffer memory 804 is configured to temporarily store expiration data information and authentication information received from the internet service server 200 over the Internet 400 under the control of a control portion 803, which will be described later. On the other hand, a memory 805 is configured to store expiration date information and authentication information in the authentication apparatus 800.

The control portion 803 may be a computing apparatus such as a microcomputer and a CPU (central processing unit). The control portion 803 internally contains an information authentication program and, in accordance with the program, loads information to be compared in the buffer memory 804 from the internet service server 200 over the Internet 400 based on information received from the information receiving portion 801. The control portion 803 controls a comparing portion 806 to compare information received from the information receiving portion 801 and information stored in the buffer memory 804 or memory 805. The control portion 803 performs various kinds of processing relating to information authentication, such as control of the authenticating portion 807, which will be described later, based on the result of the comparison by the comparing portion 806. However, the program may be stored in a CD-ROM or a DVD-ROM. In this case, the control portion 803 may load the program therefrom and execute the program as necessary.

The authenticating portion 807 may include a display information creating portion 808 and a display portion 809. The display information creating portion 808 is configured to create display information based on a signal from the control portion 803 after having received the comparison result. The display portion 809 may include a liquid crystal display device and is configured to display the comparison result.

The authenticating portion 807 may include a voice output portion 810 and a speaker 811. The voice output portion 810 may include a DSP (Digital Signal Processor) and supplies a voice signal to the speaker 8 based on a signal from the control portion 803 after having received the comparison result.

The authenticating portion 807 may include an actuator portion 812. More specifically, when the actuator portion 812 is used with an entrance gate, the opening of the gate is controlled based on a signal from the control portion 803 after having received the comparison result.

Figure 9:
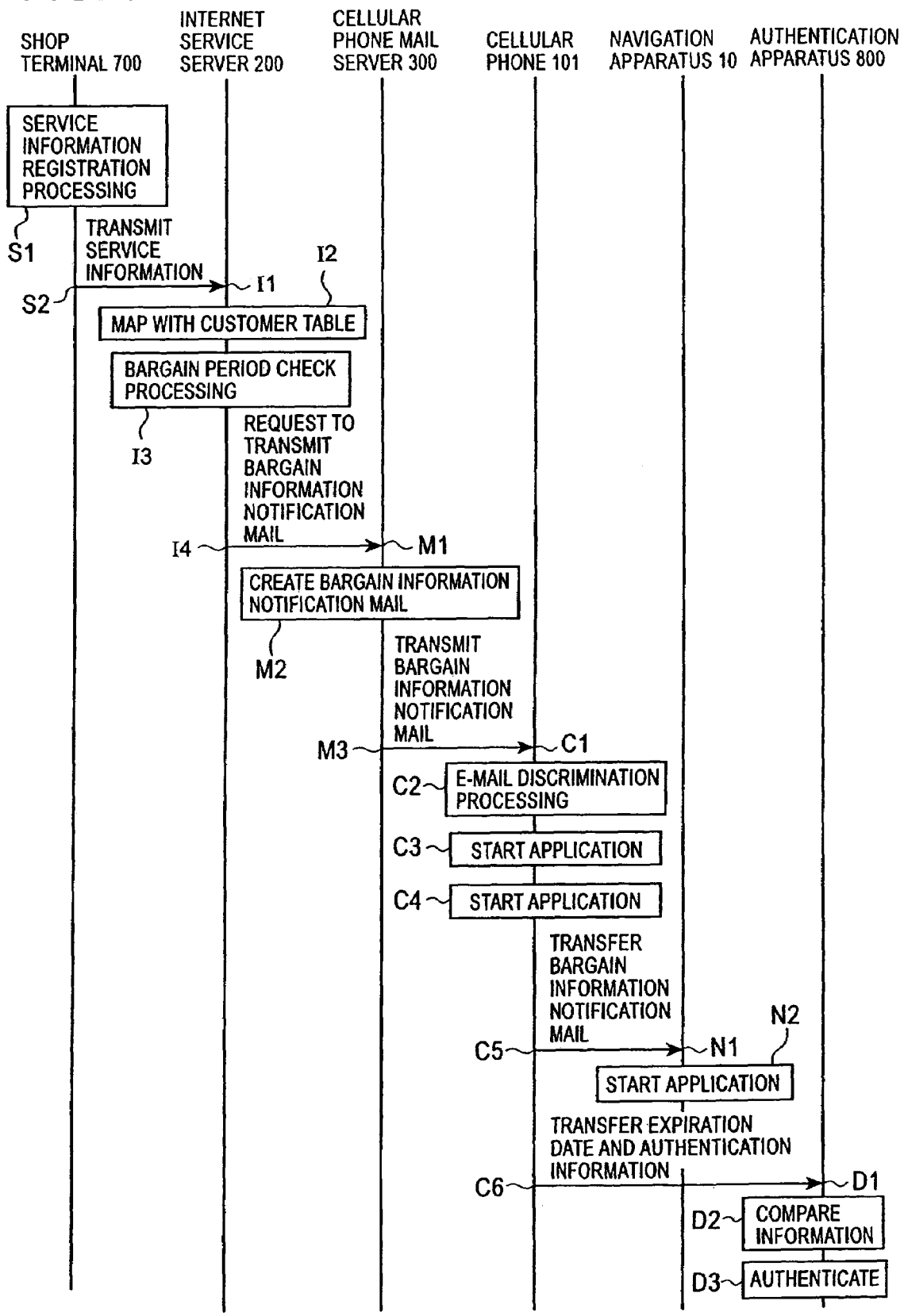
FIG. 9 is a sequence diagram showing operations for providing notice of bargain information to a customer according to the second embodiment of the present invention.

Next, operations of the information link service system 100 according to this embodiment will be described with reference to the drawings. FIG. 9 is a sequence diagram showing the operations for a customer to receive a discount service in a bargain store. In this case, the service to be provided by a shop may be a priority service for time-limited goods.

Figure 11A:
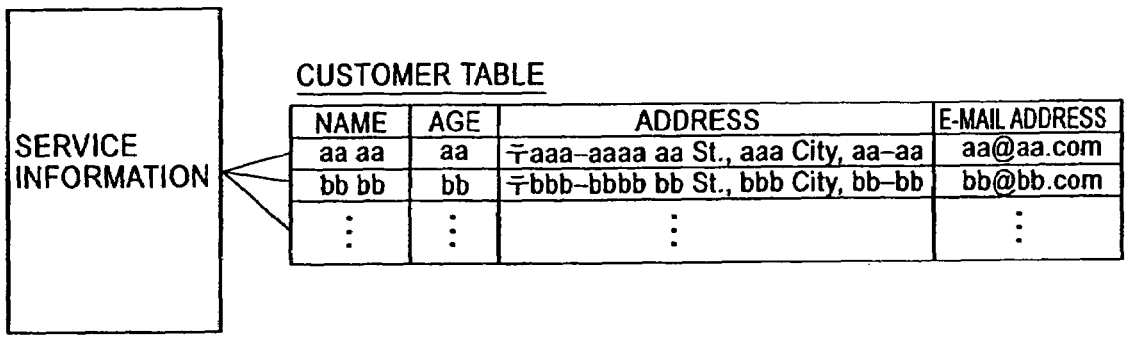
FIGS. 11A to 11C are diagrams showing processing for mapping service information and customer tables according to the second embodiment of the present invention.
Figure 11B:
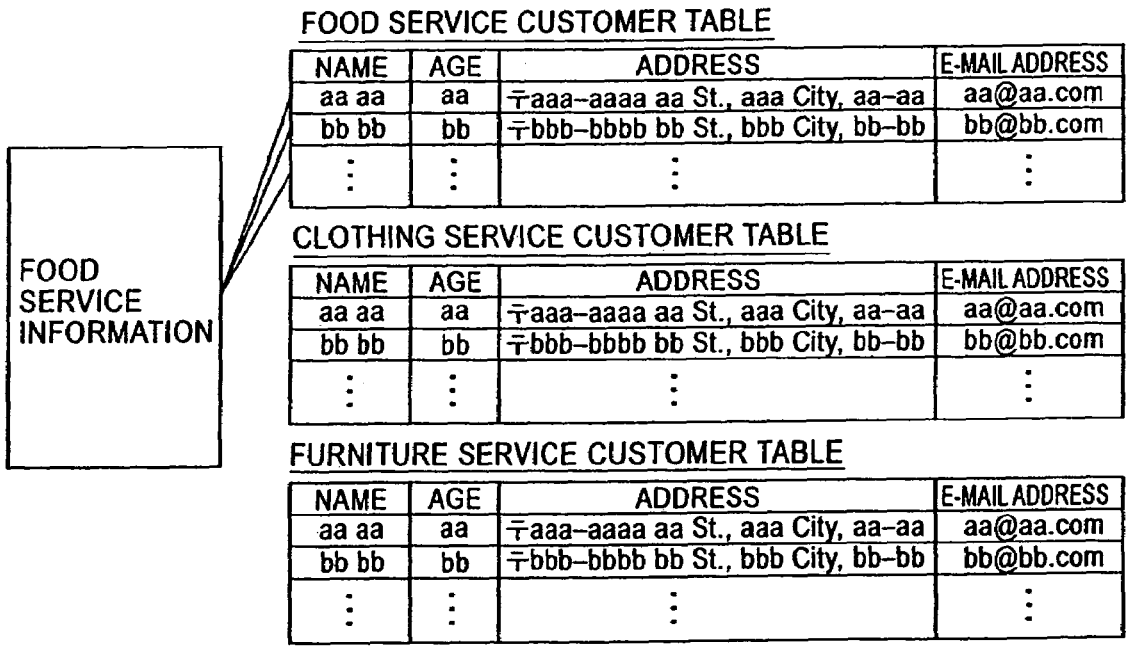
Figure 11C:
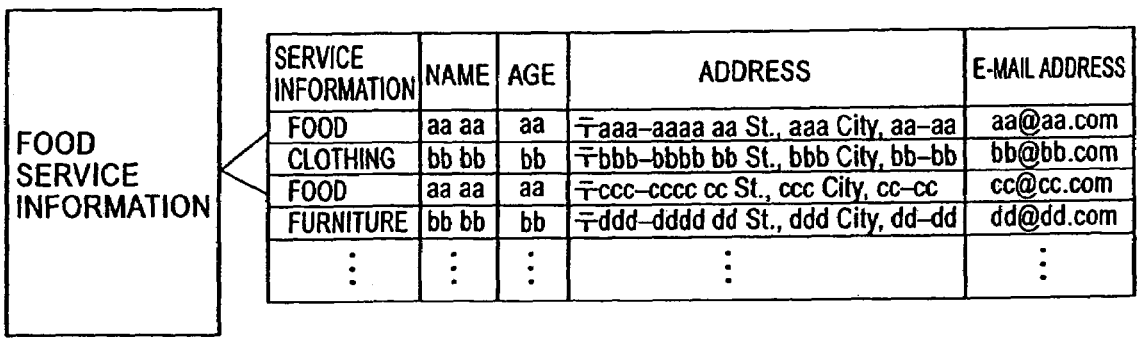

As shown in FIG. 9, a store uses the shop terminal 700 to first perform service information registration processing (S1) for registering information on a bargain period, bargain details and discount notice, discount authentication information service as tag information, expiration date information, store location information, and information on an application to be started with the internet service server 200. This processing transmits and registers service information from the shop terminal 700 to the internet service server 200 (S2→I1). The internet service server 200 includes a customer table and maps the registered service information with the customer table (I2). As shown in FIG. 10, the customer table includes the name, address, contact e-mail address, and so on of customers. The registered service information is, as shown in FIG. 11A, mapped with the customers in the customer table by the customer table mapping processing (I2). As shown in FIG. 11B, multiple customer tables may be provided, each for a service type. For example, customer tables for service types such as food, clothing, and furniture sales may be mapped with registered service information. This can be implemented by including a service type in service information registered details and mapping a customer table for each service type and service information. As shown in FIG. 11C, a service type may be defined for each customer in the customer table and mapped with service information.

As shown in FIG. 9, the internet service server 200 performs bargain period check processing (I3). In order to implement this, the internet service server 200 checks a registered bargain period. The internet service server 200 refers to bargain periods and determines whether any one of them is applicable or not in the bargain period check processing (I3). The determination can be defined in any manner such that at any date before the bargain period, such as one month before the bargain period, can be determined. If any one is applicable in the bargain period check processing (I3), the internet service server 200 requests the cellular phone mail server 300 to transmit an e-mail notifying a customer of bargain-related service information (I4→M1). At the same time, information such as the contact e-mail address in the customer table, bargain information, discount information, shop location information and so on registered by the service information registration processing (S1) is also provided to the cellular phone mail server 300.

The cellular phone mail server 300 receives the bargain information notification mail transmission request from the internet service server 200, creates an e-mail (bargain information notification mail) based on the customer's e-mail address and transmission information received from the internet service server 200 (M2), and transmits the e-mail to the cellular phone 101 (M3→C1). Note that the bargain information notification mail is an information link mail and has, in the body or a predetermined extended area, a description for starting a predetermined application (called start-application information hereinafter) in the cellular phone 101 and the navigation apparatus 10 as the transmission information.

The cellular phone 101 receives the bargain information notification mail and performs processing for discriminating whether the received e-mail is normal mail or an information link mail (e-mail discrimination processing) (C2). In other words, the cellular phone 101 has a mail discriminating portion for discriminating whether the received e-mail is an information link mail. If it is an information link mail, the cellular phone 101 reads start-application information described in the bargain information notification mail and starts the corresponding application (which may be called information link program) (C3). In other words, the cellular phone 101 has an application executing portion for executing a predetermined application based on the information described in the information link mail transferred from the cellular phone mail server 300. This operation stores the expiration date information and discount authentication information in the cellular phone 101.

The cellular phone 101 is connected to the navigation apparatus 10 through a wireless LAN. The cellular phone 101 reads start-application information described in the bargain information notification mail, starts the corresponding application and determines whether the time in the bargain information notification mail is within the expiration period or not (C4). If it is within the expiration period, the bargain information notification mail is transferred to the navigation apparatus 10 (C5→N1). In other words, the cellular phone 101 has a mail transferring portion for, if the e-mail is an information link mail, transferring the information link mail to the vehicle-mounted apparatus. Whether a received e-mail is an information link mail can be easily discriminated by analyzing predetermined tag information in the e-mail. Alternatively, only necessary information may be transferred to the navigation apparatus 10 instead of the entire e-mail. When the cellular phone 101 and the navigation apparatus 10 are not connected, the cellular phone 101 transfers it at the next connection.

Figure 12:
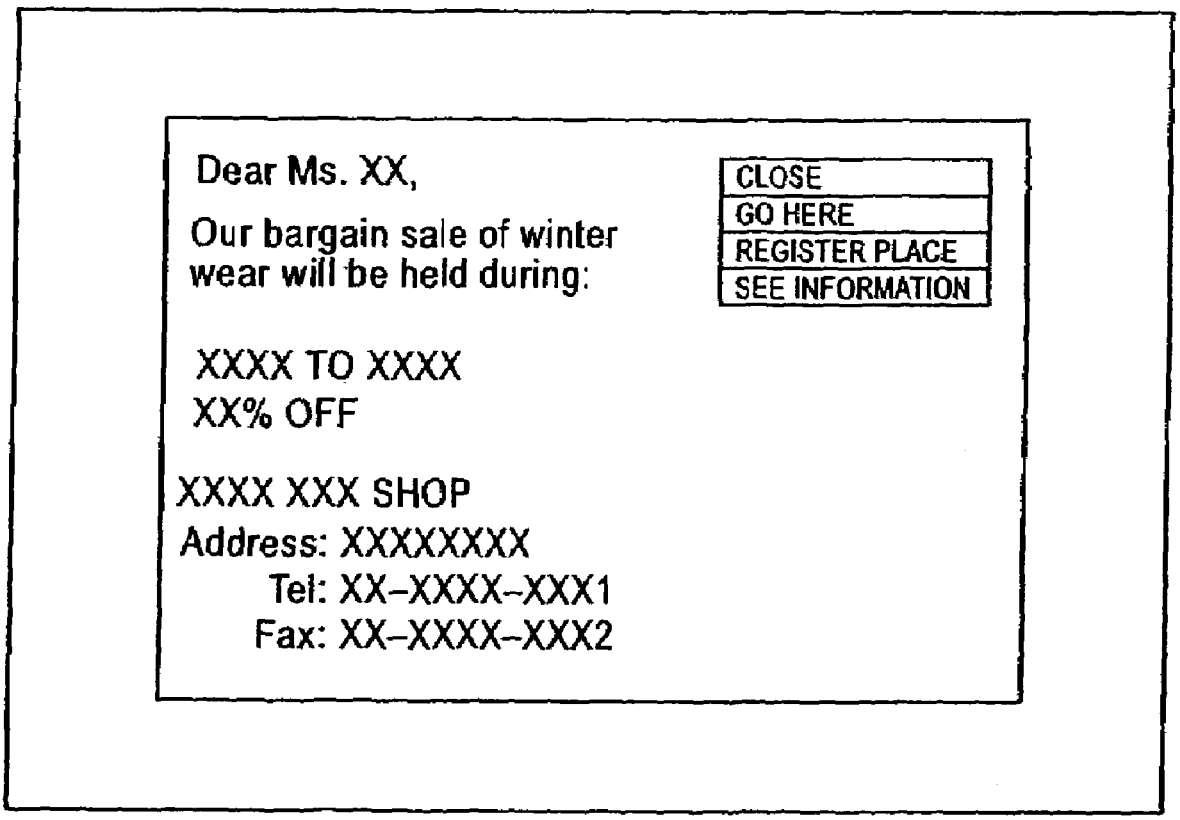
FIG. 12 is a diagram showing a notification screen example to be displayed on the display portion 7 in response to an operation shown in FIG. 9.

The navigation apparatus 10 receives the bargain information notification mail, reads the start-application information described in the update notification mail, and starts the corresponding application (N2). In other words, the navigation apparatus 10 has an application executing portion for executing a predetermined application based on the described information in the information link mail transferred from the cellular phone 101. Since bargain information is provided to a user, for example, in this embodiment, the operation causes the display portion 7 of the navigation apparatus 10 to display a notification screen as shown in FIG. 12. For example, a joystick of the navigation apparatus 10 may be manipulated to select "GO HERE" under an operation menu so that the bargain place can be defined as a destination. Alternatively, "REGISTER PLACE" under the operation menu may be selected if the user wants to visit the bargain place later. Once the place is registered by the operation, the bargain place can be easily searched as a registered place through "SEARCH IN REGISTERED PLACES" under another operation menu later and can be defined as a destination. The selection of "SEE INFORMATION" can provide the details of the bargain information based on the information described in the bargain information notification mail. Note that the operation menus may not be displayed as described above. Also, the operating unit is not limited to a joystick. For example, the display portion 7 may have a touch-panel and may be directly touched to operate. When the bargain place is defined as a destination, the navigation apparatus 10 searches a path thereto and guides the user so that the user can reach the bargain place easily.

A cashier in the bargain place has the authentication apparatus 800. The cellular phone 101 is communicable with the authentication apparatus 800 through the wireless tag reader 900 included in the authentication apparatus 800. When a user places the cellular phone 101 over the wireless tag reader 900 for payment, the expiration date information and discount authentication information are transmitted to the authentication apparatus 800 (C6→D1) as shown in FIG. 9. The authentication apparatus 800 checks the expiration date information and discount authentication information (D2) and authenticates if the user is a qualified person before the expiration date (D3). The authentication unit may include a display portion in the authentication device 800, for example, to display discount authentication information and/or a check result, or may generate a chime or buzzer sound. If discount authentication information is displayed, a different discount rate defined for specific users may be checked, for example, instead of an even discount rate. If authenticated, the store discounts from the payment by the user. Thus, the service information notification by e-mail can guide a user to the bargain place easily and can provide the user with a discount service on payment without requiring the user to present his/her ID card or membership card.

Third Embodiment

Figure 13:
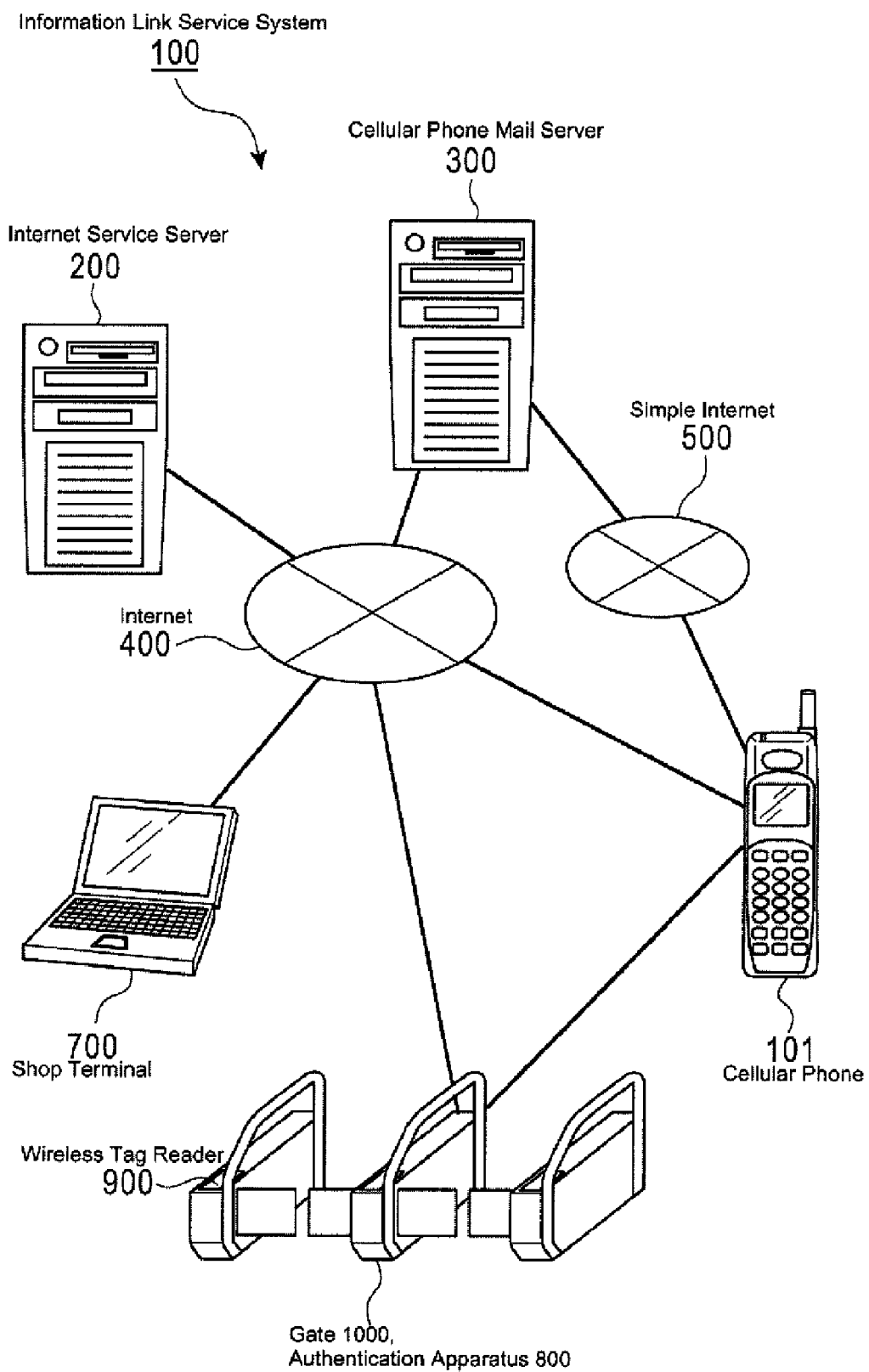
FIG. 13 is a system diagram showing a configuration of an information link service system 100 according to a third embodiment of the present invention.

A third embodiment according to the present invention will be described in detail with reference to the drawings. FIG. 13 is a system diagram showing a configuration of an information link service system 100 according to this embodiment. As shown in FIG. 13, components of the information link service system 100 are the same as the components of the second embodiment shown in FIG. 7, except that the information link service system 100 further includes an event site gate 1000 instead of the navigation apparatus 10. According to this embodiment, the authentication apparatus 800 is provided as the event site gate 1000, and the wireless tag reader 900 is provided at the event site gate 1000.

According to this embodiment, the components of the information link service system 100 are communicably connected substantially in the same manner as the components of the second embodiment shown in FIG. 7. However, according to this embodiment, the authentication apparatus 800 serving as the event site gate 1000 is communicably connected to the internet service server 200 over the Internet 400.

Figure 14:
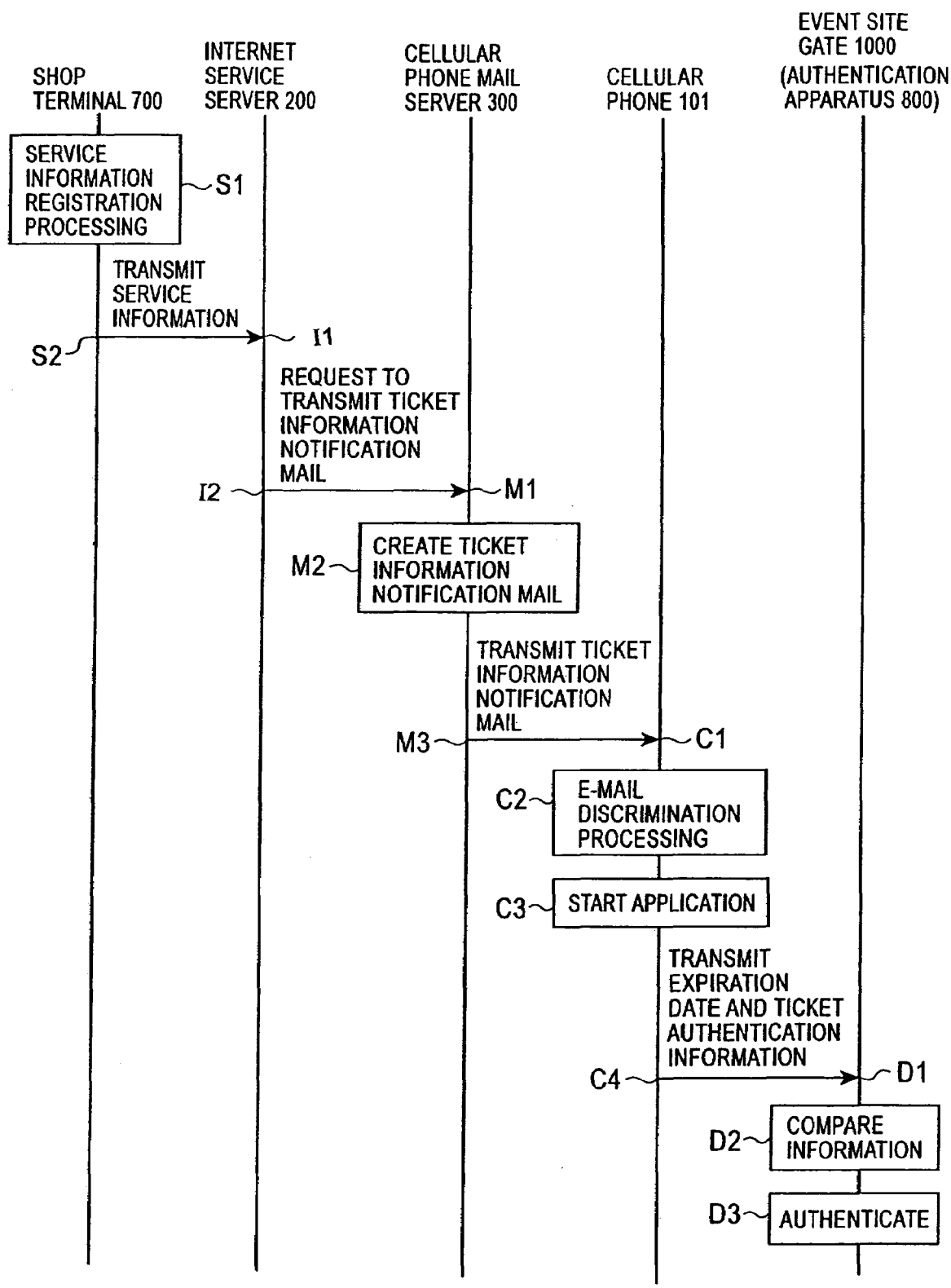
FIG. 14 is a sequence diagram showing operations for providing notice of ticket information to a subscriber according to the third embodiment of the present invention.

Next, operations of the information link service system 100 according to this embodiment will be described with reference to the drawings. FIG. 14 is a sequence diagram showing the operations until a ticket subscriber passes through the event site gate 1000 according to this embodiment.

As shown in FIG. 14, when a subscriber makes a reservation for an event ticket over the Internet or telephone, the ticket selling company first uses the shop terminal 700 to perform service information registration processing (S1) for registering ticket information on the event name, date, event site and so on, ticket authentication information serving as tag information, expiration date information, and information on an application to be started with the internet service server 200. The reservation over the Internet may be configured to automatically perform the service information registration processing (S1). This processing transmits and registers service information from the shop terminal 700 to the internet service server 200 (S2→I1).

Upon registration of the service information to complete the registration, the internet service server 200 requests the cellular phone mail server 300 to transmit an e-mail for providing notice of ticket information to the subscriber (I2→M1). At the same time, the subscriber's contact e-mail address, ticket information registered by the service information registration processing (S1), ticket authentication information, expiration date information and so on are also provided to the cellular phone mail server 300.

The cellular phone mail server 300 having received the ticket information notification mail transmission request from the internet service server 200 creates an e-mail (ticket information notification mail) based on the subscriber's e-mail address and reception information received from the internet service server 200 (M2) and transmits the e-mail to the cellular phone 101 (M3→C1). Note that the ticket information notification mail is an information link mail and has, in the body or a predetermined extended area, a description for starting a predetermined application (called start-application information hereinafter) in the cellular phone 101.

The cellular phone 101 receives the ticket information notification mail, performs processing for discriminating whether the received e-mail is normal mail or an information link mail (e-mail discrimination processing) (C2). In other words, the cellular phone 101 has a mail discriminating portion for discriminating whether the received e-mail is an information link mail. If it is an information link mail, the cellular phone 101 reads start-application information described in the ticket information notification mail and starts the corresponding application (which may be called an information link program) (C3). In other words, the cellular phone 101 has an application executing portion for executing a predetermined application based on the information described in the information link mail transferred from the cellular phone mail server 300. This operation stores the expiration date information and ticket authentication information in the cellular phone 101.

The event site gate 1000 serving as the authentication apparatus 800 is provided at the entrance of the event site. The wireless tag reader 900 is provided on the entrance side of the event site gate 1000. The cellular phone 101 is communicable with the event site gate 1000 through the wireless tag reader 900 included in the event site gate 1000. When the subscriber places the cellular phone 101 over the wireless tag reader 900 to pass through the gate of the event site, the expiration date information and ticket authentication information are transmitted to the authentication apparatus 800 (C4→D1) as shown in FIG. 14. The event site gate 1000 compares the expiration date information and reservation authentication information with the information in the internet server 200 over the Internet 400 (D2). The subscriber is authenticated if the subscriber is a qualified person before the expiration date as a result of the comparison (D3). The authentication opens the event site gate 1000 and allows the subscriber to enter. Thus, the ticket information notification by e-mail allows the subscriber to enter the event site without requiring the subscriber to present the ticket. Therefore, the subscriber does not need to go to a ticket seller to obtain a ticket after making a ticket reservation.

Fourth Embodiment

Figure 15:
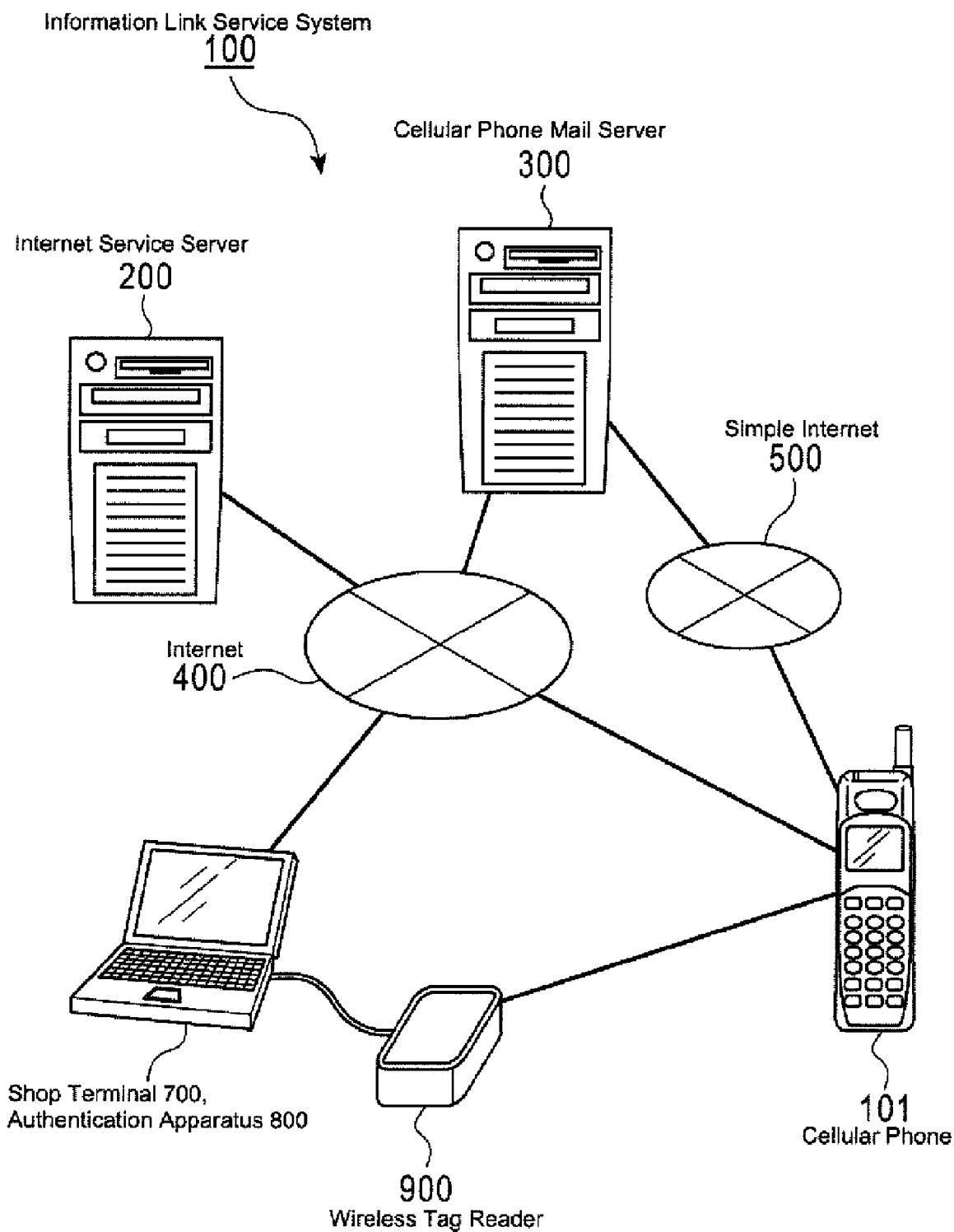
FIG. 15 is a system diagram showing a configuration of an information link service system 100 according to a fourth embodiment of the present invention.

A fourth embodiment according to the present invention will be described in detail with reference to the drawings. FIG. 15 is a system diagram showing a configuration of an information link service system 100 according to this embodiment. As shown in FIG. 15, components of the information link service system 100 are the same as the components of the third embodiment shown in FIG. 13, except that the information link service system 100 does not include the event site gate 1000. According to this embodiment, the shop terminal 700 includes the wireless tag reader 900, and the shop terminal 700 additionally has comparison and authentication functions to serve as the authentication apparatus 800. However, the authentication apparatus 800 may be an independent apparatus including the wireless tag reader 900.

According to this embodiment, the components of the information link service system 100 are communicably connected substantially in the same manner as the components of the third embodiment shown in FIG. 13. However, according to this embodiment, the shop terminal 700 serving as the authentication apparatus 800 is communicably connected to the internet service server 200 over the Internet 400.

Figure 16:
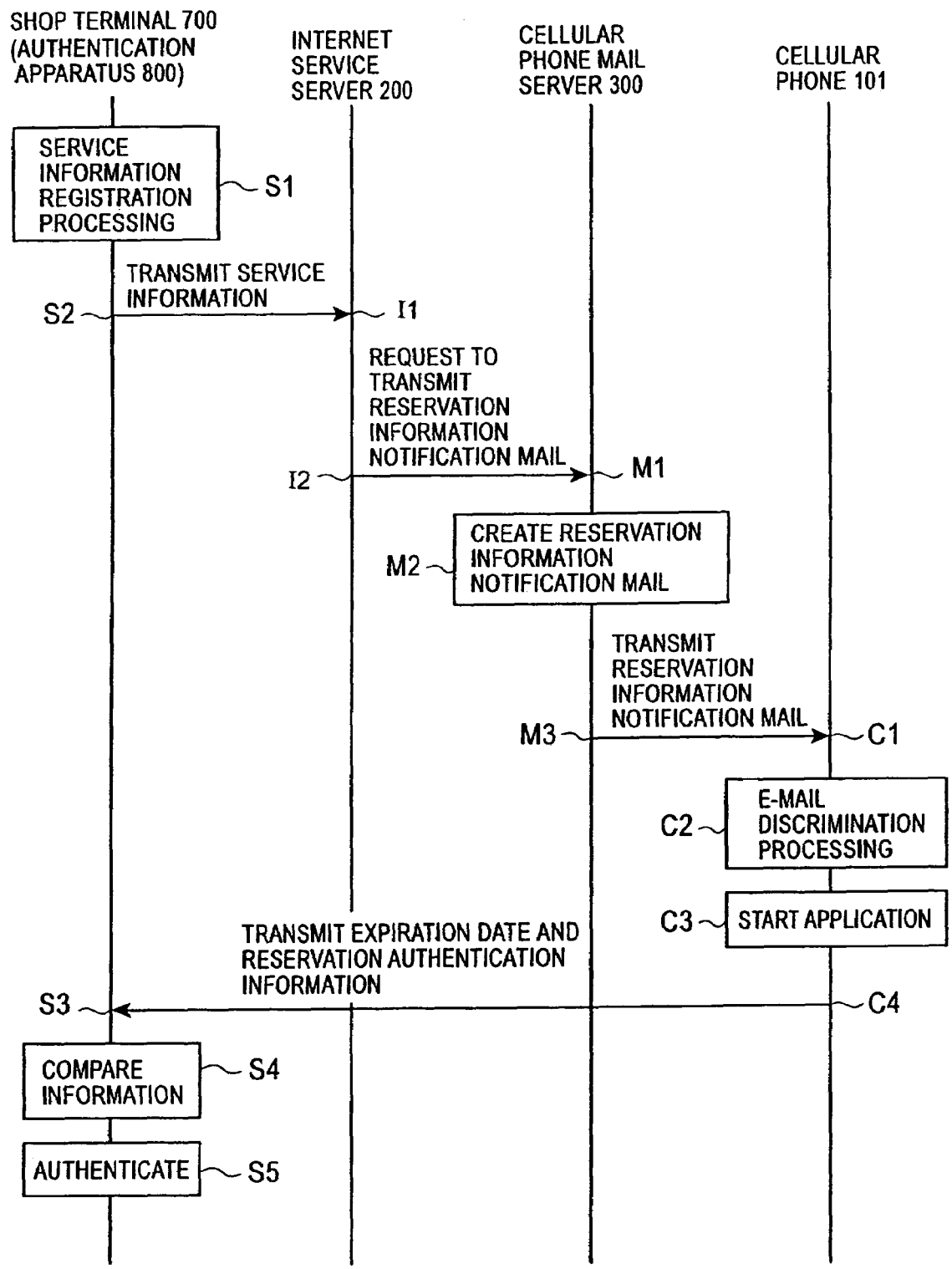
FIG. 16 is a sequence diagram showing operations for providing notice of video reservation information to a subscriber according to the fourth embodiment of the present invention.

Next, operations of the information link service system 100 according to this embodiment will be described with reference to the drawings. FIG. 16 is a sequence diagram showing the operations until a subscriber rents a video according to this embodiment. However, the present invention obviously is applicable to almost all rental shops for not only videos as in this embodiment but also CDs, DVDs, books and so on.

As shown in FIG. 16, when a subscriber makes a reservation for a video over the Internet or telephone, the video rental shop first uses the shop terminal 700 to perform service information registration processing (S1) for registering reservation information on the video title, shop and so on, reservation authentication information serving as tag information, expiration date information, and information on an application to be started with the internet service server 200. The reservation over the Internet may be configured to automatically perform the service information registration processing (S1). This processing transmits and registers service information from the shop terminal 700 to the internet service server 200 (S2→I1).

Upon completion of the registration of the reservation information, the internet service server 200 requests the cellular phone mail server 300 to transmit an e-mail for providing notice of reservation information to the subscriber (I2→M1). At the same time, the subscriber's contact e-mail address, reservation information registered by the service information registration processing (S1), reservation authentication information, expiration date information and so on are also provided to the cellular phone mail server 300.

The cellular phone mail server 300 having received the reservation information notification mail transmission request from the internet service server 200 creates an e-mail (reservation information notification mail) based on the subscriber's e-mail address and reception information received from the internet service server 200 (M2) and transmits the e-mail to the cellular phone 101 (M3→C1). Note that the ticket information notification mail is an information link mail and has, in the body or a predetermined extended area, a description for starting a predetermined application (called start-application information hereinafter) as the transmission information in the cellular phone 101.

The cellular phone 101 receives the reservation information notification mail, performs processing for discriminating whether the received e-mail is normal mail or an information link mail (e-mail discrimination processing) (C2). In other words, the cellular phone 101 has a mail discriminating portion for discriminating whether the received e-mail is an information link mail. If it is an information link mail, the cellular phone 101 reads start-application information described in the reservation information notification mail and starts the corresponding application (which may be called an information link program) (C3). In other words, the cellular phone 101 has an application executing portion for executing a predetermined application based on the information described in the information link mail transferred from the cellular phone mail server 300. This operation stores the expiration date information and reservation authentication information in the cellular phone 101.

The wireless tag reader 900 is provided at the counter of the video rental shop. The cellular phone 101 is communicable with the shop terminal 700 through the wireless tag reader 900 at the counter. The shop terminal 700 has comparison and authentication functions to serve as the authentication apparatus 800. When the subscriber goes to the counter and places the cellular phone 101 over the wireless tag reader 900, the expiration date information and reservation authentication information are transmitted to the authentication apparatus 800 (C4→S3) as shown in FIG. 16. The shop terminal 700 compares the expiration date information and reservation authentication information with the information in the internet server 200 over the Internet 400 (S4). The subscriber is authenticated if the subscriber is a qualified person before the expiration date as a result of the comparison (S5). The fact that the subscriber has been authenticated is displayed on the display of the shop terminal 700. Since the video rental shop can prepare the reserved video in advance based on the reservation information, the subscriber can receive the video at the counter immediately after the authentication. Furthermore, the present invention is applicable to an unattended shop that rents a video automatically. Thus, a reservation information notification for video rental by e-mail allows a subscriber to receive and rent a video without requiring the subscriber to present his/her membership card. Furthermore, the subscriber can receive an intended video without having to search for it through the video-rental shop since the video-rental shop can prepare the reserved video in advance.

While there has been illustrated and described what is at present contemplated to be preferred embodiments of the present invention, it will be understood by those skilled in the art that various changes and modifications may be made, and equivalents may be substituted for elements thereof without departing from the true scope of the invention. In addition, many modifications may be made to adapt a particular situation to the teachings of the invention without departing from the central scope thereof. Therefore, it is intended that this invention not be limited to the particular embodiments disclosed, but that the invention will include all embodiments falling within the scope of the appended claims.

What is claimed is:

1. An information link service system comprising:

a server;

a mobile terminal which can receive an e-mail from the server, where the mobile terminal is configured to be carried by a user; and electronic equipment which is communicable with the mobile terminal over a predetermined local network;

a table in the server configured to include information relating to the mobile terminal, and which is associated with information relating to the electronic equipment, wherein:

the server transmits to the mobile terminal an information link mail as a type of e-mail in a PUSH-type service format, where the information link mail includes information identifying the e-mail as an information link mail and a description for executing a predetermined application in the electronic equipment, the server referring to the table to facilitate transmission of the e-mail;

the mobile terminal has a mail discriminating portion for discriminating whether a received e-mail is an information link mail or not by referring to the identifying information and a mail transferring portion for, if the e-mail is an information link mail, transferring the information link mail to the electronic equipment;

the electronic equipment has an application executing portion for executing a predetermined application based on the described information in the information link mail transferred from the mobile terminal;

the application executing portion is configured to facilitate automatic updating of the predetermined application if the described information in the information link mail indicates an update version; and the server updates the information in the table after the predetermined application is executed.

2. The information link service system according to claim 1, wherein the mail discriminating portion discriminates whether a received e-mail is an information link mail with reference to predetermined tag information in the e-mail.

3. The information link service system according to claim 1, further comprising an authentication apparatus communicable with the mobile terminal and the server over a predetermined network, the authentication apparatus having a comparing portion for comparing predetermined information including an expiration date based on the information link mail received from the mobile terminal with information that the server has and an authenticating portion for performing authentication based on the result of the comparison.

4. The information link service system according to claim 1, wherein:
   the electronic equipment is vehicle-mounted equipment; and
   the information relating to the electronic equipment includes information relating to an inspection of a vehicle having the electronic equipment.

5. The information link service system according to claim 1, wherein the server transmits the information link mail at a predetermined timing.

6. The information link service system according to claim 1, wherein the predetermined application includes a description for executing an update of a program included in the electronic equipment.

7. The information link service system according to claim 1, wherein the predetermined application includes a description for sending predetermined information to a display portion included in the electronic equipment.

8. The information link service system according to claim 1, wherein the electronic equipment has a navigation function.

9. Electronic equipment communicable over a predetermined local network with a mobile terminal, which is configured to: be carried by a user, receive an e-mail based on a PUSH-type service format, discriminate whether a received e-mail is an information link mail or not by referring to identifying information included in the e-mail, and transfer an e-mail determined to be an information link mail to the electronic equipment, the electronic equipment comprising:
   a receiving portion for receiving from the mobile terminal an information link mail, where an information link mail includes information identifying the e-mail as an information link mail and a description for executing a predetermined application;
   an application executing portion for executing a predetermined application based on the described information in an information link mail received by the receiving portion, wherein the application executing portion is configured to facilitate automatic updating of the predetermined application if the described information in the information link mail indicates an update version; and wherein
   the mobile terminal communicates with a server to receive the e-mail, the server including a table in which information relating to the mobile terminal is associated with information relating to the electronic equipment, and wherein the server transmits the e-mail by reference to the table and updates information in the table after the predetermined application is executed.

10. The electronic equipment according to claim 9, wherein the predetermined application includes a description for executing an update of a program included in the electronic equipment.

11. The electronic equipment according to claim 9, wherein the predetermined application includes a description for sending predetermined information to a display portion included in the electronic equipment.

12. The electronic equipment according to claim 9, wherein the predetermined application includes a description for discriminating predetermined tag information within the information link mail and outputs, to a display portion, at least one of service information, positional information on service supply, and a display prompting whether or not a destination is to be defined, based on the predetermined tag information.

13. The electronic equipment according to claim 9, wherein:
   the information link mail is an e-mail for providing notice of at least one of an inspection time, oil change time, and oil filter exchange time; and
   the predetermined application is an application for providing the notice by e-mail to a user.

14. The electronic equipment according to claim 9, wherein:
   the information link mail is an e-mail for providing notice of the existence of an update version of an application contained in the electronic equipment; and
   the predetermined application is an application for downloading and installing the update version from a predetermined server.

15. A mobile terminal communicable over a predetermined local network with electronic equipment, which receives an information link mail and executes a predetermined application based on described information in the information link mail, the mobile terminal comprising:
   a receiving portion for receiving an e-mail in a PUSH-type service format;
   a mail discriminating portion for discriminating whether the e-mail received by the receiving portion is an information link mail as a type of e-mail, where an information link mail includes information identifying the e-mail as an information link mail and a description for executing a predetermined application, and configured to facilitate automatic updating of the predetermined application if the described information in the information link mail indicates an update version;
   a transferring portion for, if the e-mail is an information link mail, transferring the information link mail to the electronic equipment;
   a server configured to communicate with the mobile terminal and transmit the e-mail to the mobile terminal, the server including a table in which information relating to the mobile terminal is associated with information relating to the electronic equipment, the server updating the information in the table after the predetermined application is executed; and
   wherein the mobile terminal is configured to be carried by a user.

16. The mobile terminal according to claim 15, wherein the mail discriminating portion discriminates whether a received e-mail is an information link mail by reference to predetermined tag information within the e-mail.

17. The mobile terminal according to claim 15, wherein the information link mail includes expiration date information.

18. The mobile terminal according to claim 15, further comprising an application executing portion for executing a predetermined application based on information described in the information link mail.

19. The mobile terminal according to claim 18, wherein the predetermined application includes a description for storing predetermined information described in the information link mail in the mobile terminal.

20. The mobile terminal according to claim 18, further comprising a transmitting portion for transmitting predetermined information based on the information link mail to an authentication apparatus communicable with the mobile terminal over a predetermined network, the authentication apparatus having a comparing portion for comparing predetermined information based on the information link mail received from the mobile terminal with information that a server has and an authenticating portion for performing authentication based on the result of the comparison.

21. An authentication apparatus communicable with a mobile terminal which is configured to be carried by a user and receives an e-mail in a PUSH-type service format, discriminate whether or not a received e-mail is an information link mail as a type of e-mail, where an information link mail includes information identifying the e-mail as an information link mail, and start a predetermined application based on described information in an information link e-mail, the authentication apparatus comprising:
 a comparing portion for comparing predetermined information received from the mobile terminal based on an information link mail with information stored in a memory included in the authentication apparatus;
 an authenticating portion for performing authentication based on the result of the comparison;
 an application executing portion configured to facilitate automatic updating of the predetermined application if the described information in the information link e-mail indicates an update version; and
 wherein the mobile terminal communicates with a server to receive the e-mail, the server including a table in which information relating to the mobile terminal is associated with information relating to electronic equipment running the predetermined application, and wherein the server transmits the e-mail by reference to the table and updates information in the table after the predetermined application is executed.

22. The authentication apparatus according to claim 21, wherein:
 the predetermined information is expiration date information and discount authentication information; and
 the authentication apparatus is provided at a cashier in a store, and the authentication apparatus checks expiration date information and discount authentication information and displays the authentication result based on the result of the check on a display portion included in the authentication apparatus.

23. An authentication apparatus communicable with a server and a mobile terminal which is configured to be carried by a user and receives an e-mail in a PUSH-type service format, discriminate whether or not a received e-mail is an information link mail as a type of e-mail, where an information link mail includes information identifying the e-mail as an information link mail, and start a predetermined application based on described information in an information link mail, the authentication apparatus comprising:
 a comparing portion for comparing predetermined information received from the mobile terminal based on an information link mail with information received from the server;
 an authenticating portion for performing authentication based on the result of the comparison;
 an application executing portion configured to facilitate automatic updating of the predetermined application if the described information in the information link mail indicates an update version; and
 wherein the mobile terminal communicates with the server to receive the e-mail, the server including a table in which information relating to the mobile terminal is associated with information relating to electronic equipment running the predetermined application, and wherein the server transmits the e-mail by reference to the table and updates information in the table after the predetermined application is executed.

24. The authentication apparatus according to claim 23, wherein:
 the predetermined information is expiration date information and admission ticket authentication information;
 the authentication apparatus is provided with an entrance gate, and the authentication apparatus checks the expiration date information and admission ticket information and controls the entrance gate based on the result of the check.

25. The authentication apparatus according to claim 23, wherein:
 the predetermined information is expiration date information and rental reservation authentication information; and
 the authentication apparatus is located in a rental shop, and the authentication apparatus checks expiration date information and rental reservation authentication information and displays the authentication result on a display portion included with the authentication apparatus based on the result of the check.

26. A communication method comprising the steps of:
 receiving at a mobile terminal an e-mail transmitted from a server in a PUSH-type service format, where the mobile terminal is configured to be carried by a user;
 discriminating at the mobile terminal whether or not an e-mail transmitted from the server is an information link mail as a type of e-mail, where an information link mail includes information identifying the e-mail as an information link mail and a description for executing a predetermined application in electronic equipment;
 transferring, if the e-mail is an information link mail, the information link mail from the mobile terminal to the electronic equipment over a predetermined local network; and
 executing, in the electronic equipment, a predetermined application based on the described information in an information link mail transferred from the mobile terminal, and automatically updating the predetermined application if the described information in the information link mail indicates an update version; and
 wherein the mobile terminal communicates with the server to receive the e-mail, the server including a table in which information relating to the mobile terminal is associated with information relating to the electronic equipment, and wherein the server transmits the e-mail by reference to the table and updates information in the table after the predetermined application is executed.

27. The communication method according to claim 26, wherein the step of executing implements an update of a program included in the electronic equipment.

28. The communication method according to claim 26, wherein the step of executing sends predetermined information to a display portion included with the electronic equipment.

29. The communication method according to claim 26, further comprising the steps of:

if the e-mail is an information link mail, executing, in the mobile terminal, a predetermined application based on information described in the information link mail;

transmitting, from the mobile terminal, predetermined information based on the information link mail to an authentication apparatus communicable with the mobile terminal over a predetermined network, the authentication apparatus having a comparing portion for comparing predetermined information based on the information link mail received from the mobile terminal and information that the server has and an authenticating portion for performing authentication based on the result of the comparison;

checking, in the authentication apparatus, predetermined information based on the information link mail received from the mobile terminal; and performing, in the authentication apparatus, authentication based on the result of the check.

30. The communication method according to claim 29, wherein, in the mobile terminal, the step of executing includes storing predetermined information described in the information link mail in the mobile terminal.

31. The communication method according to claim 29, wherein the step of checking includes comparing predetermined information based on the information link mail and information that a memory included with the authentication apparatus has.

32. The communication method according to claim 29, wherein the step of checking includes that the authentication apparatus communicates with the server over a predetermined network and compares predetermined information based on the information link mail and information that the server has.

* * * * *

UNITED STATES PATENT AND TRADEMARK OFFICE
CERTIFICATE OF CORRECTION

PATENT NO. : 7,636,564 B2 Page 1 of 1
APPLICATION NO. : 11/212499
DATED : December 22, 2009
INVENTOR(S) : Yuji Funato It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 148 days.

Signed and Sealed this

Ninth Day of November, 2010

David J. Kappos
*Director of the United States Patent and Trademark Office*